(12) United States Patent
Libby et al.

(10) Patent No.: US 9,090,005 B2
(45) Date of Patent: Jul. 28, 2015

(54) BLOWN FILM FASTENING

(75) Inventors: Christopher C. Libby, Allenstown, NH (US); Christopher M. Gallant, Nottingham, NH (US); William P. Clune, Hillsborough, NH (US)

(73) Assignee: Velcro Industries B.V., Willemstad (CW)

( * ) Notice: Subject to any disclaimer, the term of this patent is extended or adjusted under 35 U.S.C. 154(b) by 483 days.

(21) Appl. No.: 13/613,878

(22) Filed: Sep. 13, 2012

(65) Prior Publication Data

US 2013/0256954 A1 Oct. 3, 2013

Related U.S. Application Data

(60) Provisional application No. 61/619,157, filed on Apr. 2, 2012.

(51) Int. Cl.

| B29C 49/04 | (2006.01) |
|---|---|
| B29C 47/00 | (2006.01) |
| A44B 18/00 | (2006.01) |
| B29C 55/28 | (2006.01) |
| B29L 31/00 | (2006.01) |
| B29C 47/20 | (2006.01) |
| B29C 47/88 | (2006.01) |
| B29C 47/08 | (2006.01) |

(52) U.S. Cl.
CPC ......... *B29C 47/0066* (2013.01); *A44B 18/0049* (2013.01); *B29C 47/009* (2013.01); *B29C 47/0021* (2013.01); *B29C 47/0026* (2013.01); *B29C 47/0057* (2013.01); *B29C 47/0092* (2013.01); *B29C 47/0898* (2013.01); *B29C 47/20* (2013.01); *B29C 47/8835* (2013.01); *B29C 55/28* (2013.01); *B29C 2791/007* (2013.01); *B29C 2793/0054* (2013.01); *B29C 2793/0063* (2013.01); *B29L 2031/729* (2013.01)

(58) Field of Classification Search
CPC .. B29C 47/0026; B29C 47/0066; B29C 47/20
See application file for complete search history.

(56) References Cited

U.S. PATENT DOCUMENTS

| 4,003,972 A | 1/1977 | Herz |
|---|---|---|
| 4,101,614 A | 7/1978 | Havens |

(Continued)

FOREIGN PATENT DOCUMENTS

| DE | 2209944 C3 | 9/1975 |
|---|---|---|
| EP | 719507 A1 | 7/1996 |

(Continued)

OTHER PUBLICATIONS

International Search Report and Written Opinion for International Application No. PCT/EP2013/056531 mailed Aug. 7, 2013 (10 pp).

*Primary Examiner* — James Sanders

(74) *Attorney, Agent, or Firm* — Fish & Richardson P.C.

(57) ABSTRACT

A method for forming a film of plastic material includes urging molten resin through a die head opening to form a stalk having an extrusion profiled rail of resin material extending radially outward from a tubular wall, the die head opening including an annular orifice that defines a thickness of the tubular wall and a cross-sectional shape of the rail; cutting the rail to form discrete elements while leaving the tubular wall un-punctured; and inflating the stalk with a gas bubble maintained within an interior space of the tubular wall to form a thin film tube.

38 Claims, 18 Drawing Sheets

(56) References Cited

U.S. PATENT DOCUMENTS

| | | |
|---|---|---|
| 4,201,741 A | 5/1980 | Pannenbecker |
| 4,699,580 A | 10/1987 | Co |
| 4,931,003 A | 6/1990 | VanErden |
| 6,163,939 A | 12/2000 | Lacey et al. |
| 6,582,642 B1 | 6/2003 | Buzzell et al. |
| 7,141,283 B2 | 11/2006 | Janzen et al. |
| 2004/0187276 A1 | 9/2004 | Seth et al. |
| 2005/0263936 A1 | 12/2005 | Bosse |
| 2006/0255497 A1 | 11/2006 | Prevotat |

FOREIGN PATENT DOCUMENTS

| | | |
|---|---|---|
| GB | 1165856 A | 10/1969 |
| WO | WO9823249 A1 | 7/1998 |
| WO | WO03059110 A2 | 7/2003 |
| WO | WO2008093168 A2 | 8/2008 |

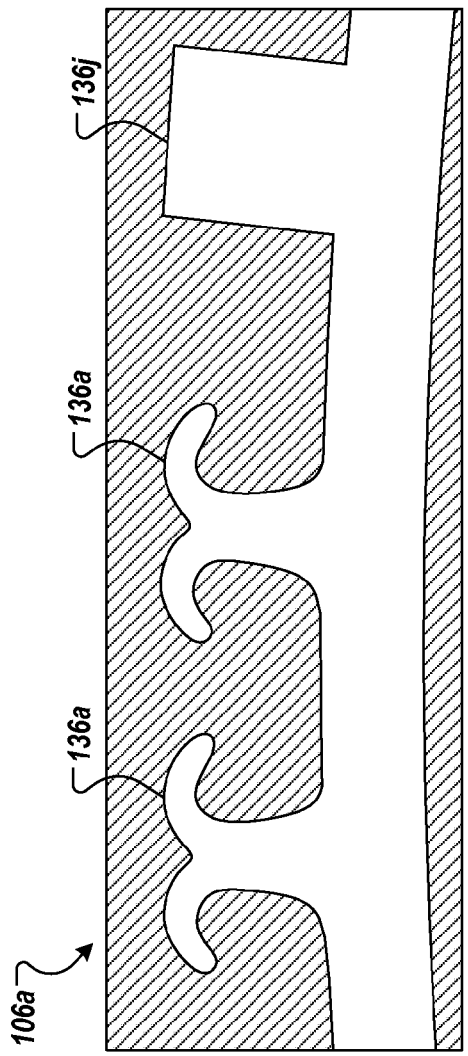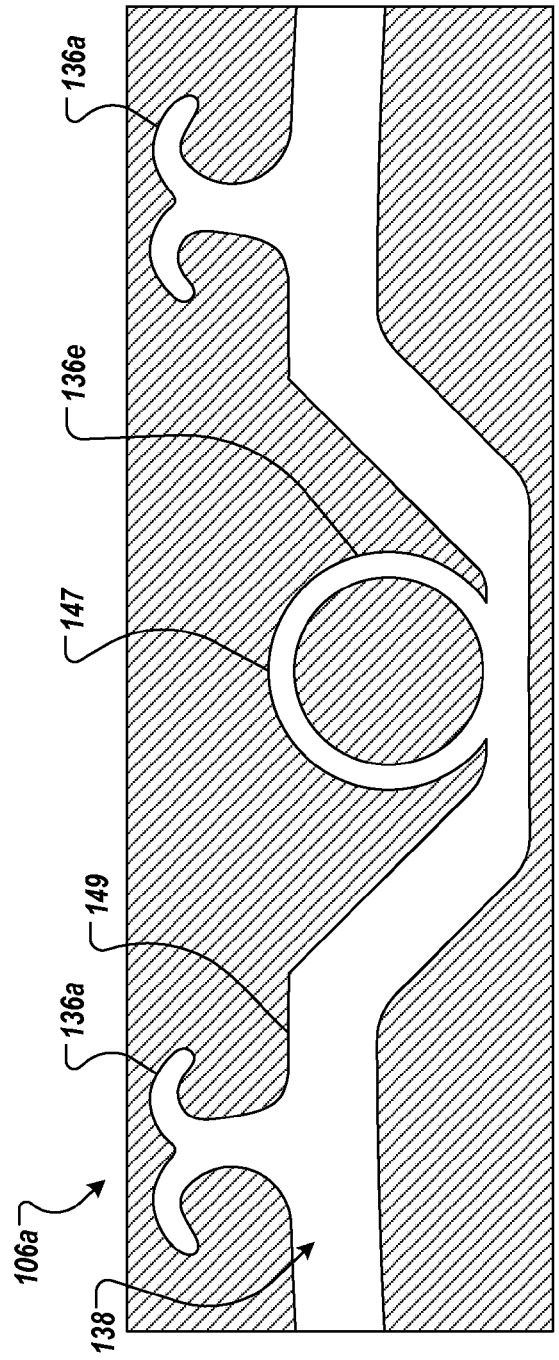

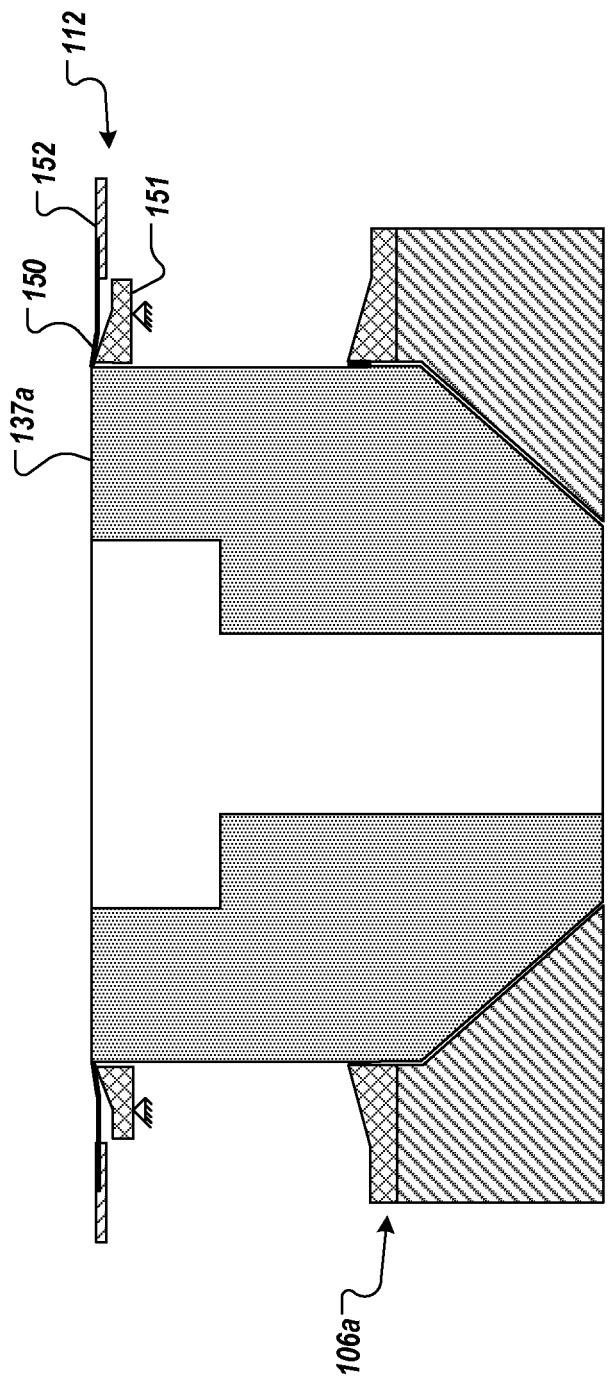
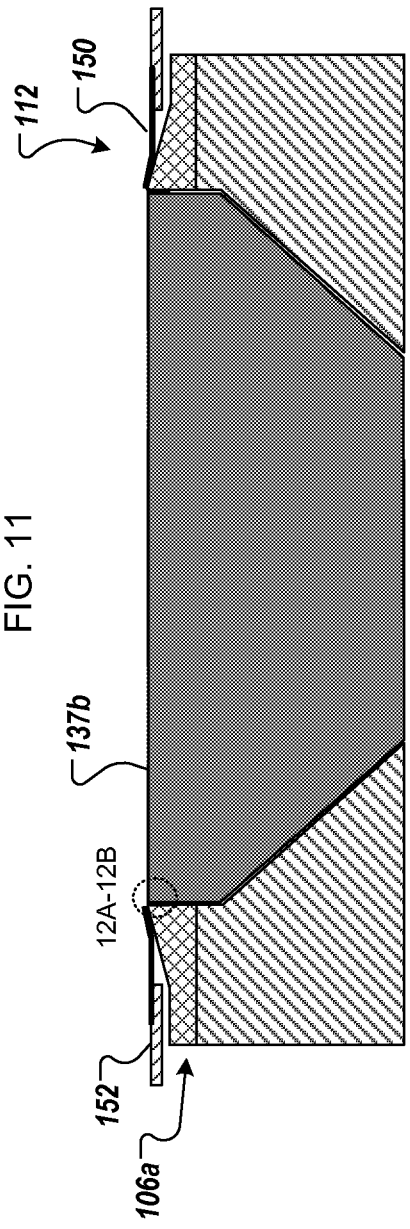
FIG. 11
FIG. 12A

BLOWN FILM FASTENING

TECHNICAL FIELD

The present invention relates to blown film products, and more particularly to blown film products having discrete fastener elements formed on an outer surface.

BACKGROUND

Traditionally, hook-and-loop fasteners comprise two mating components that releasably engage with one another, thus allowing coupling and decoupling of the two surfaces or objects. The male fastener portion typically includes a substrate having fastener elements, such as hooks, extending from the substrate. The fastener elements stand discretely from a surface of the substrate, and are referred to as "loop-engageable" in that they are configured to releasably engage with fibers of the mating component.

Originally, hook touch fasteners were formed by weaving methods. Many modern hook fasteners are formed by molding processes in which the fastener stems and a connecting sheet of resin are formed together, such as on a rotating mold roll. In another known method, a sheet of resin is cast or extruded to have profiled rails that are subsequently cut and the sheet stretched to separate rail segments to form discrete fasteners. Such a method is sometimes referred to as a 'cut and stretch' method. Other known methods involve screen printing.

While some male fastener elements are designed to engage loops or fibers of a female fastening product, others are designed to engage with other male fastener elements in an interlocking closure.

SUMMARY

One aspect of the invention features a method for forming a film of plastic material that includes urging molten resin through a die head opening to form a stalk having an extrusion profiled rail of resin material extending radially outward from a tubular wall, the die head opening including an annular orifice that defines a thickness of the tubular wall and a cross-sectional shape of the rail; cutting the rail to form discrete elements while leaving the tubular wall un-punctured; and inflating the stalk with a gas bubble maintained within an interior space of the tubular wall to form a thin film tube. Cutting the rail includes slicing through the rail as molten resin uninterruptedly extrudes from the annular orifice.

In some cases, slicing through the rail includes driving a blade widthwise through the rail. In some applications, slicing through the rail includes driving a blade around a circumference of the stalk. In some instances, slicing through the rail includes driving a blade through the rail at a distance from the die head, when the resin material has at least partially solidified. In some embodiments, slicing through the rail includes driving a blade through the rail when the blade is biased against an outer surface of the die head, prior to solidification of the resin material. In some implementations, slicing through the rail includes driving a blade through the rail cleanly, without removing resin material from the extruded stalk. In some embodiments, slicing through the rail includes driving a blade having a straight, angled cutting edge through the rail. In some examples, slicing through the rail includes driving a blade having a curved cutting edge through the rail. In some cases, slicing through the rail includes driving a blade through the rail such that first contact by the blade with the rail is made at the base of the rail.

In some embodiments, driving the blade includes driving the blade at a linear velocity between about 2.7 and 7.4 inch/second.

In some examples, driving the blade includes driving the blade continuously in a clockwise or counterclockwise direction. In some implementations, driving the blade includes driving the blade in a helical cutting path, with respect to the stalk. In some cases, the blade includes one or more blades, and driving the one or more blades in a helical cutting path includes driving the one or more blades at a sufficient rotational speed to achieve a cut-time interval of between about 0.2 and 3.3 seconds.

In some instances, driving the blade includes driving the blade in an oscillating routine. In some examples, driving the blade includes driving the blade in a zig-zag cutting path, with respect to the stalk.

In some cases, the method further includes drawing the tube, in the extrusion direction, away from the die head during the cutting. In some examples, drawing the tube including pulling the tube through a nip between adjacent rollers.

Another aspect of the invention features a method for forming a film of plastic material that includes urging molten resin through a die head opening to form a stalk having multiple extrusion profiled rails of resin material extending radially outward from a tubular wall, the die head opening including an annular orifice that defines a thickness of the tubular wall and a respective cross-sectional shape of each of the multiple rails; forming discrete elements of resin material on an outer surface of the tubular wall; and inflating the stalk with a gas bubble maintained within an interior space of the tubular wall to form a thin film tube. Forming discrete elements of resin material includes dividing at least one of the multiple rails into the discrete elements while leaving at least one other of the multiple rails continuous and unbroken.

In some applications, forming discrete elements of resin material includes forming discrete fastener elements. In some cases, dividing the at least one rail includes interrupting extrusion of the rail. In some implementations, dividing the at least one rail includes cutting the rail. In some examples, cutting the rail includes slicing through the rail as molten resin uninterruptedly extrudes from the annular orifice.

In some cases, slicing through the rail includes driving a blade widthwise through the rail. In some applications, slicing through the rail includes driving a blade around a circumference of the stalk. In some instances, slicing through the rail includes driving a blade through the rail at a distance from the die head, when the resin material has at least partially solidified. In some embodiments, slicing through the rail includes driving a blade through the rail when the blade is biased against an outer surface of the die head, prior to solidification of the resin material. In some implementations, slicing through the rail includes driving a blade through the rail cleanly, without removing resin material from the extruded stalk. In some embodiments, slicing through the rail includes driving a blade having a straight, angled cutting edge through the rail. In some examples, slicing through the rail includes driving a blade having a curved cutting edge through the rail. In some cases, slicing through the rail includes driving a blade through the rail such that first contact by the blade with the rail is made at the base of the rail.

In some embodiments, driving the blade includes driving the blade at a linear velocity between about 2.7 and 7.4 inch/second.

In some examples, driving the blade includes driving the blade continuously in a clockwise or counterclockwise direction. In some implementations, driving the blade includes driving the blade in a helical cutting path, with respect to the stalk. In some cases, the blade includes one or more blades, and driving the one or more blades in a helical cutting path includes driving the one or more blades at a sufficient rotational speed to achieve a cut-time interval of between about 0.2 and 3.3 seconds.

In some instances, driving the blade includes driving the blade in an oscillating routine. In some examples, driving the blade includes driving the blade in a zig-zag cutting path, with respect to the stalk.

In some cases, the method further includes drawing the tube, in the extrusion direction, away from the die head during the cutting. In some examples, drawing the tube including pulling the tube through a nip between adjacent rollers.

Yet another aspect of the invention features a blown film apparatus that includes an extruder including a die head defining a cylindrical bore, the bore of the die head having a radially extending cavity protruding outward from its circumference; a gas source coupled to the extruder, the gas source being configured to inject gas into an area within the circumference of the bore; and a cutting ring including a flange mounted for rotation about the die head, and a cutting blade coupled to the flange. The cutting blade is positioned such that rotation of the flange causes the cutting blade to trace a cutting path around the die head traversing the radially extending cavity.

In some applications, the radially extending cavity is shaped like the cross-section of a fastener element. In some cases, the radially extending cavity includes a tapered inner surface, such that a dimension of the cavity increases in an extrusion direction. In some instances, the radially extending cavity includes an irregular shape with at least one corner of the cavity having an acute cusp shape.

In some implementations, the apparatus further includes a mandrel disposed within the bore of the die head, the mandrel defining a radial width of an annular ring. In some examples, the radial width of the annular ring is between about 0.01 and 0.09 inch.

In some instances, the cutting blade is biased against a surface of the die head. In some applications, the cutting blade is spaced away from a surface of the die head.

In some cases, the cutting blade includes a straight, angled cutting edge. In some embodiments, the angled cutting edge is angled at about 37 degrees.

In some implementations, the cutting blade includes a curved cutting edge. In some applications, the curved cutting edge defines a radius of about 0.06 inch.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 6 is an enlarged top view of a die head including a die cavity defining the shape of a non-fastening structure.

FIG. 7 is an enlarged top view of a die head including a recessed die cavity.

FIG. 11 is a cross-sectional view of a cutting ring mounted at a distance from a blown film extruder.

FIG. 12A is a cross-sectional view of a cutting ring mounted directly adjacent a blown film extruder.

Like reference symbols in the various drawings indicate like elements.

DETAILED DESCRIPTION

Figures 1A, 1B, 1C:
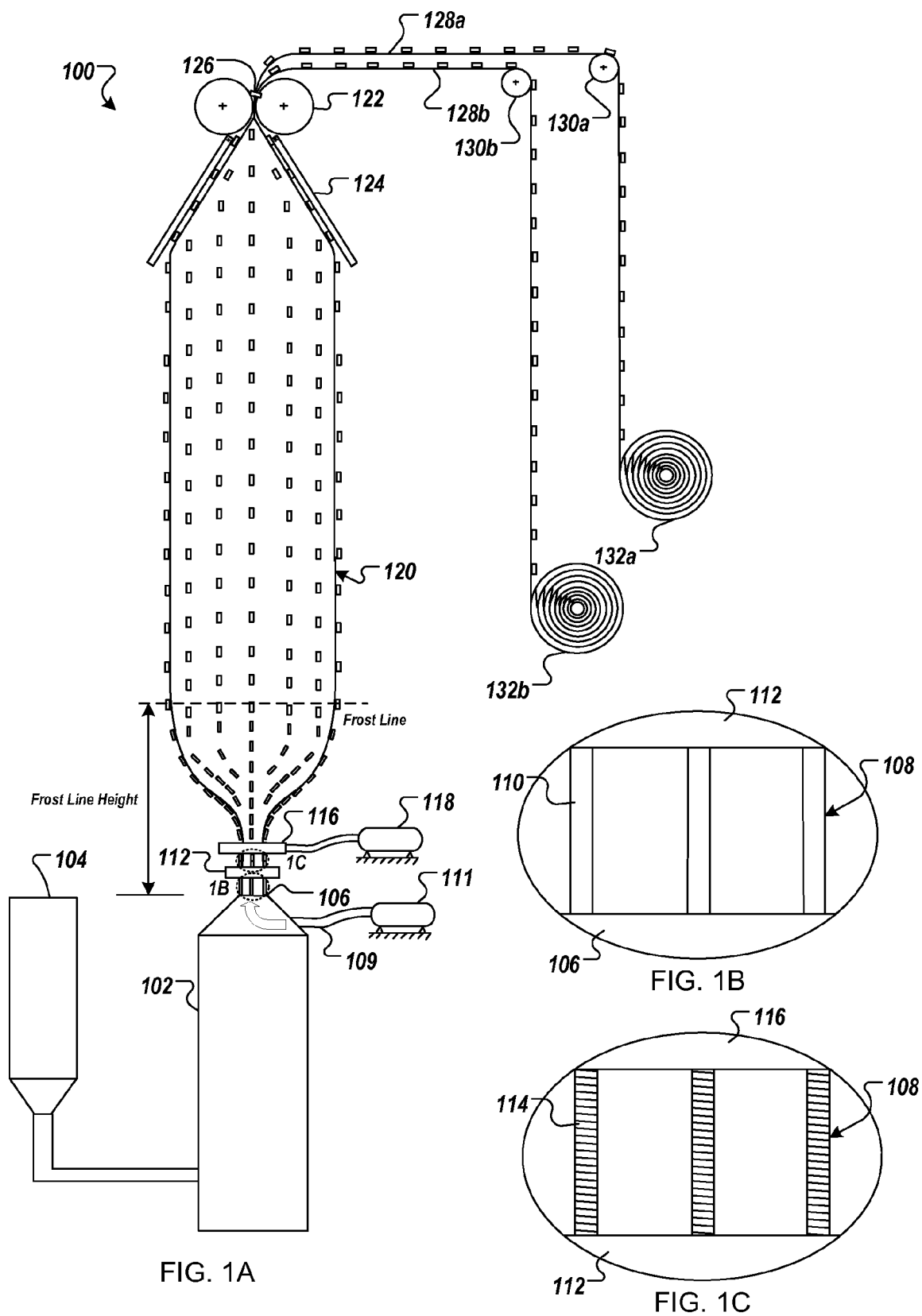
FIG. 1A is a schematic representation of a blown film apparatus.
FIG. 1B is an enlarged view of an area marked 1B in FIG. 1A.
FIG. 1C is an enlarged view of an area marked 1C in FIG. 1A.

Referring to FIGS. 1A-1C, blown film apparatus 100 includes an extruder 102 receiving raw thermoplastic resin material (e.g., polyethylene pellets or granules, such as NA 960000 Petrothene®) from a feed apparatus 104. Other thermoplastic materials having mechanical properties suitable for blown film applications (e.g., blown film grade plastics), as well as mixtures or combinations of such materials, can also be used. Extruder 102 heats the raw resin material to an appropriate melt temperature and provides the material, in the form of molten resin, to a die head 106 under a constant extrusion pressure. The extrusion pressure urges the molten resin through an annular orifice of die head 106 that is shaped to extrude a tubular stalk 108 with continuous rails 110 extending radially outward from its peripheral outer surface (see FIG. 1B).

Following its extrusion, stalk 108 is fed to a cutting ring assembly 112 that severs continuous rails 110 widthwise to form discrete elements 114 (see FIG. 1C). In this example, the cutting ring is spaced apart from the die head to allow the continuous rails to at least partially solidify before the cutting operation. Further details of the cutting ring are discussed below with respect to FIGS. 10A and 10B.

As stalk 108 is extruded through the annular orifice of die head 106, it is drawn (e.g., pulled) downstream, along the axis of extrusion, by rollers 122. The rollers can pull the stalk away from the die head orifice at a predetermined take-up speed (e.g., about 5 feet per minute in small developmental lines and between about 100-300 feet per minutes in large production lines). The pulling can be controlled to cause desirable stretching of stalk 108 in the extrusion or longitudinal direction. As a result of such stretching, the stalk experiences axial elongation and a reduction in its wall thickness, or "gauge". At the same time stalk 108 is being pulled downstream, it is being inflated by a gas bubble (e.g., an air bubble) trapped within its hollow interior. The bubble can be provided, for example, by injecting gas through a conduit 109 coupled to a gas source 111, as known in the art of film blowing. In some examples, the gas bubble is maintained at slightly above atmospheric pressure. Even relatively low pressure inflation of stalk 108 can be controlled by known film-blowing techniques to cause it to stretch and expand radially in a controlled manner until a thin film tube 120 is formed. The radial expansion increases the diameter of the stalk and further decreases its gauge. In some examples, a set of guide rings and/or a sizing cage (not shown) is used to limit radial expansion of the stalk and to maintain its stability.

In many applications, it is useful for the radial expansion and longitudinal stretching to occur simultaneously, resulting in a biaxial stretching of the base between fastener elements. Longitudinal stretching and radial expansion also work to alter the overall fastener element density in the final product, by changing the spacing between adjacent fastener elements (e.g., the pitch between rows and the space between columns). As a practical matter, the amount of stretching and expansion may be limited by the acceptable fastener element density necessary to achieve desired fastening properties. Other factors may also be considered in determining the amount of stretching, for example, the desired backing thickness of the product and/or the limit of the tube to expand without rupture.

In a particular example, the pressure within the blown tube (i.e., the "blow pressure") is maintained between about 0.01 and 0.04 psi above ambient pressure. An appropriate blow pressure, however, can be determined based on several contributing factors. For example, the resin material properties, the extruded gauge of the stalk, and/or the desired dimensions of the blown tube can be considered in determining an appropriate blow pressure. Insufficient blow pressure can inhibit expansion of the tube, while excessive blow pressure can cause the tube to rupture.

In some cases, gas from the trapped bubble may leak through the nip, reducing the pressure inside the stretching tube. Accordingly, additional gas injections can be provided to the interior space of the stalk intermittently (e.g., as need or according to predetermined time intervals) or continuously. In some examples, shrinkage of the tube can be detected by tube proximity sensors placed along the tube's length, and gas introduced to or removed from the tube interior in response to feedback from the tube proximity sensors. Tube interior pressure may alternatively be monitored as a control variable.

A "blow ratio" can be used to express the degree of permanent radial expansion achieved by inflation of the stalk. The blow ratio refers to a mathematical relationship of the tube's layflat width (i.e., the collapsed tube width before slitting, which may be equal to about one half of the inflated tube circumference) compared to the diameter of the extrusion die head orifice. A blow ratio greater than one indicates that the stalk has been radially expanded following extrusion, and that the gauge has been proportionally reduced. In some particular examples, blow ratios of approximately 1, 1.2, 1.3, and 2.5 were achieved. A "gauge reduction ratio" can be used to express the total amount of gauge reduction resulting from bi-axial stretching of the extruded stalk. The gauge reduction ratio refers to a mathematical relationship of the tube's final gauge compared to a radial width of the annular die head orifice (the "die gap"). In particular implementations, various gauge reduction ratios spanning a range of approximately 0.2 to 0.9 were achieved.

Heat loss from the extruded polymer to its surrounding environment causes the molten resin emerging from die head 106 to crystallize and solidify over time. In industry, the point marking a transition between molten and crystallized resin is termed the "frost line". Most (if not all) of the radial and axial stretching of the stalk occurs between the die head exit and the frost line. Further, in some cases, the position of the frost line with respect to the die head (termed the "frost line height") can affect the process stability. For example, the process may become unstable if the frost line height is too great, due to inherent difficulties in supporting a large area of expanding molten resin. Accordingly, a cooling ring 116 is provided to apply cooling air (or any other suitable gas, for example, nitrogen gas), produced by a blower 118, to the outer surface of stalk 108. The cooling air can be ambient air, or air that has been pre-conditioned (e.g., cooled or chilled air). In some examples, the cooling ring is operable to direct cooling air towards selected areas on the exterior of the stalk. For example, the cooling ring 116 may be able to direct air to a position on stalk 108 that is further upstream, further downstream, and/or directly tangent to its location with respect to the stalk.

The cooling air promotes crystallization of the molten resin to maintain the frost line at a stable position. For these and other reasons, it may be advantageous to control the position of the frost line to a target area, such that sufficient expansion of the stalk is achieved while maintaining stability in the process line. For example, U.S. Pat. No. 4,101,614, the entirety of which is hereby incorporated by reference, describes a useful method of controlling the frost line position by monitoring the temperature of the film and controlling a cooling ring, based on the monitored film temperature. Further, although the illustrated embodiment is shown with a single cooling ring, it may be useful to include several cooling rings to provide additional cooling. For example, the tubular wall of the stalk may solidify faster than the discrete elements protruding from its outer surface. Accordingly, additional cooling rings can be provided to ensure that the discrete elements are solid enough to resist being crushed or flattened when they reach the nip between rollers 122.

In some cases, temperature control of the stalk can be improved by cooling its interior surface, in addition to the external cooling provided by cooling ring 116. For example, an "internal bubble cooling system" can be provided for this purpose. U.S. Pat. No. 4,243,363, the entirety of which is hereby incorporated by reference, describes a suitable internal bubble cooling system that includes a cooling ring positioned in the interior space of the stalk. Other appropriate internal bubble cooling systems can also be used. For instance, some internal bubble cooling systems include components for circulating the inflation gas injected into the stalk's interior. This gas can be used as a cooling medium. In some implementation, the gas can be continuously circulated such that warm or heated gas is exhausted from the stalk as an equal amount of cool gas is injected into the interior.

As tube 120 is drawn downstream, collapsing frames 124 press against the tube to collapse and flatten the stretched tube before it is introduced to a nip between rollers 122. In some examples, collapsing frames 124 are controlled to at least partially flatten tube 120 before introduction to the nip, in order to inhibit rupture of the tube. As the collapsed and flattened tube exits the nip, a cutting device 126 slits the flattened tube open along its edges, creating separate sheet-form products 128a, 128b. As shown in FIG. 1A, each of the sheet-form products comprises a base web carrying the discrete elements. Sheet form products 128a, 128b are conveyed by idler rollers 130a, 130b and wound into product rolls 132a, 132b. If a wider product is desired, the stretched tube may be slit at only one point and opened up to a product of a width equal to the circumference of the stretched tube. The stretched tube may alternatively be spiral-cut, in order to form a continuous strip-form product having fastener elements facing at an angle to the continuous direction.

In the example illustrated by FIG. 1A, the downstream machine direction is vertically upward and the upstream machine direction is vertically downward. However, in some other examples, this type of blown film line can be reversed or inverted, such that the stalk is extruded and drawn downward (i.e., in the direction of gravity). This type of downward or upside down blown film line may utilize an appropriate liquid coolant (e.g., liquid water), as opposed to a gas, for cooling and solidifying the stalk. For example, the liquid can be sprayed as a fine mist against the outer surface of the stalk to apply rapid cooling. Excess coolant runs off of the inflated bubble away from the extruder. Quenching the stalk in this manner may increase the rate of resin solidification, reducing the frost line height. The shorter cooling distance may increase the stability of the line, allowing increased operational speeds and greater product yield. Further, this type of rapid cooling blown film line may be able to achieve certain forms of the final product that are not attainable with a traditional right-side-up configuration. For example, in producing a fastening product where the discrete elements are hooks, the rapid cooling may advantageously reduce the amount of hook deformation that results from the bi-axial stretching of the stalk. As a result, taller and/or more defined hook shapes may be able to be achieved. Further, the reduced amount of stretching may also provide for higher hook densities on the final product.

As noted above, the annular die head orifice is configured to produce a tubular stalk having continuous rails extending radially outward from its peripheral outer surface. Accordingly, referring to the particular implementation shown in FIGS. 2A-2C and 3, extruder 102a includes a die head 106a having an opening comprised of a circular bore 134 with radially extending cavities 136 located at predetermined intervals along its circumference. In this example, cavities 136 are shaped like the cross-sections of fastener elements (see FIGS. 4A-4C, for example).

Figure 2A:
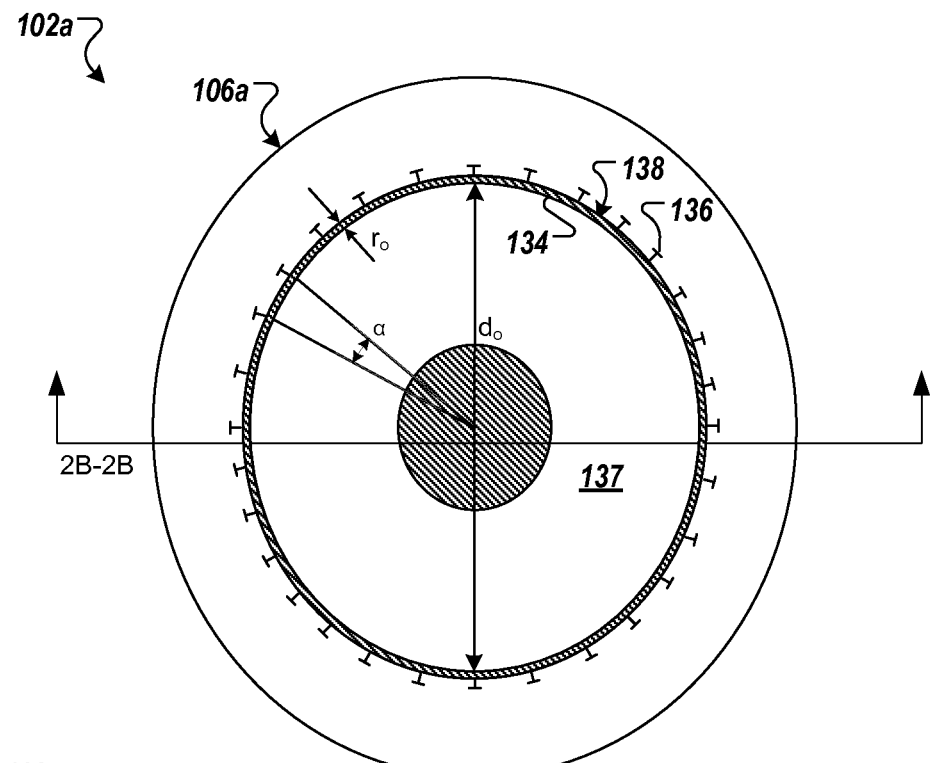
FIG. 2A is top view of a blown film extruder.
Figure 2B:
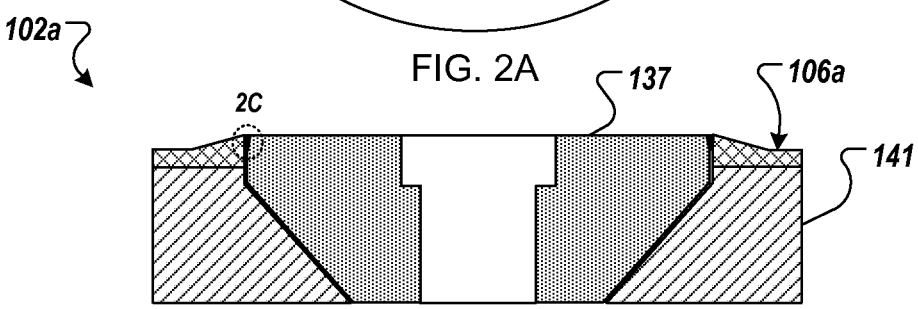
FIG. 2B is a cross-sectional view of the blown film extruder, taken along line 2B-2B.
Figure 2C:
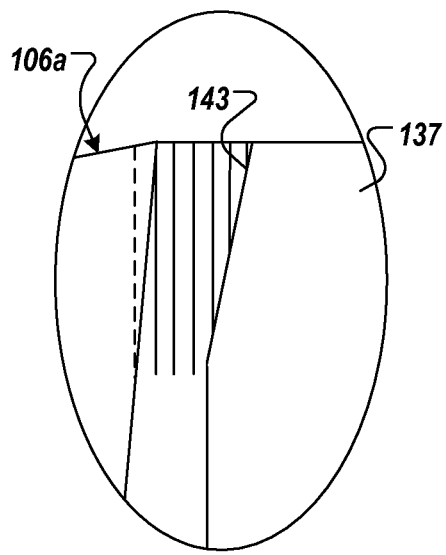
FIG. 2C is an enlarged view of an area marked 2C in FIG. 2B.
Figure 3:
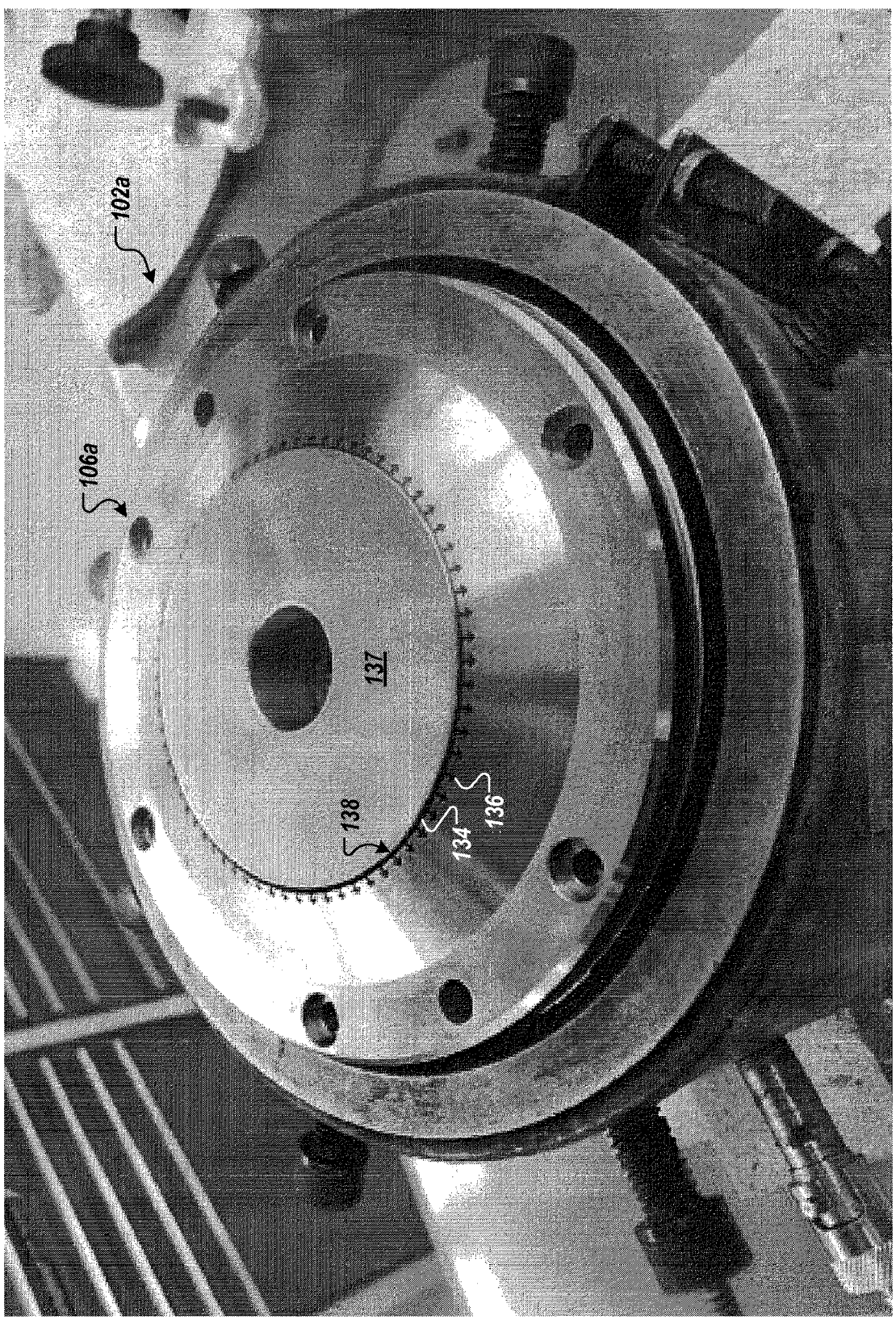
FIG. 3 is a photograph providing a perspective view of the blown film extruder of FIG. 2A.
Figure 12B:
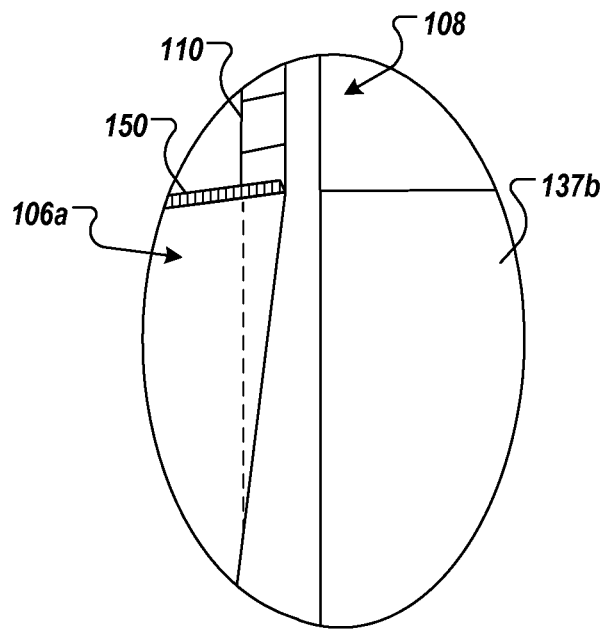
FIGS. 12B and 12C are enlarged views of an area marked 12B-12C in FIG. 12A.
Figure 12C:
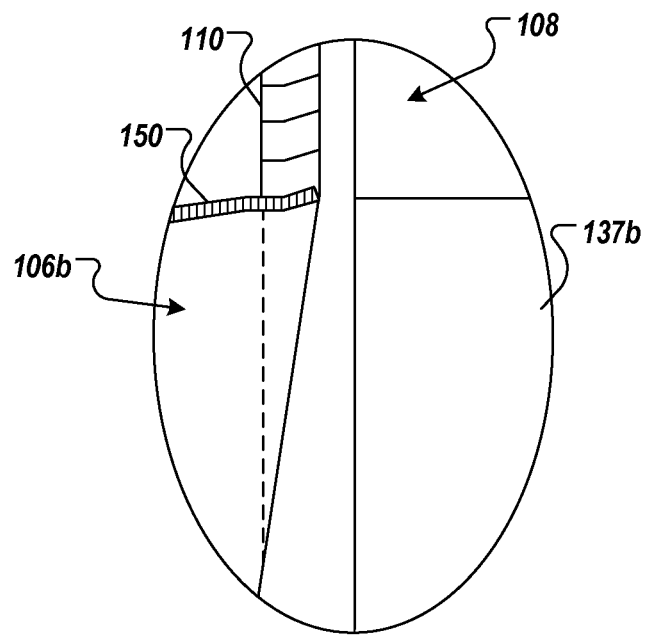

A mandrel 137 is disposed within the die head opening and cooperates with the bore 134 to form an annular orifice 138. The shape of the annular orifice is defined by its width (i.e., the die gap between bore 134 and mandrel 137) and the configuration of cavities 136. The stalk is formed when molten resin is forced through the annular orifice. Referring to FIG. 2B, extruder 102 further includes a mounting block 141 for supporting die head 106a. The mounting block is provided with an axial bore that receives the mandrel. Mandrel 137 cooperates with the bore of mounting block 141 to form an annular extrusion passage leading molten resin towards the annular orifice at the die head exit. Further, as shown in FIG. 2C, mandrel 137 is provided with a lip 143 having a slight inward taper (e.g., a taper of three degrees or less with respect to the direction of extrusion) near the die head exit (note that the figures are not drawn to scale, accordingly the taper of the mandrel lip is exaggerated for clarity). In some cases, the lip may be provided to control the gauge of the extruded stalk. For example, increasing the degree of inward taper would effectively increase the gauge of the stalk, while decreasing the inward taper would decrease the stalk's gauge. The lip can also be provided with an outward taper, or be substantially straight (i.e., no taper, as shown in FIGS. 12A-12C). Controlling the gauge of the stalk by modifying or replacing the mandrel may be a matter of practicality. In particular, this approach is much less expensive and complex than modifying or replacing the die head, which is much more difficult to manufacture. However, the tapered lip of the mandrel may also provide some utility. For example, it may allow relaxation (with the inward taper), or force further compression (with the outward taper), of the molten resin as the resin is urged through the extrusion passage. Alleviating or augmenting the extrusion pressure in this manner may provide an additional process parameter that can be varied for tuning the system to produce a final product with specific characteristics.

In a particular embodiment, the radial width $r_o$ of annular orifice 138 at the die head exit is about 0.01 inch, the diameter $d_o$ of the annular orifice (the "die diameter") is about 2.8 inches, and the angle between adjacent radial cavities a is at least about 1.8°. However, other suitable die head configurations can also be used. For example, the diameter $d_o$ of the annular orifice can be increased or decreased to produce a wider or narrower stalk. Similarly, the radial width $r_o$ of the annular orifice can be adjusted to achieve a desired wall thickness of the extruded stalk. A stalk with a thinner wall may require less blowing to achieve a desired film gauge, compared to a stalk with a thicker wall. However, the thinner walled stalk may be more susceptible to rupture during expansion. A stalk with a thicker wall may allow for a greater blow ratio without risk of rupture, and thus provides a greater area of hook product. In some cases, an appropriate radial width of the annular orifice is determined based on various process variables. For example, the size of the radial width may be determined with respect to the extrusion speed and/or the viscosity of the molten resin to ensure that enough extrusion pressure is generated to push the resin into the die cavities such that they are completely filled. In some particular implementations, the annular orifice was provided with radial width of 0.03 inch, 0.05 inch, and 0.09 inch. Additionally, the die head can include more or less of the radially extending cavities. Providing more or less cavities affects the areal density of the discrete elements formed on the stalk outer surface after the cutting and stretching operations.

Figure 4A:
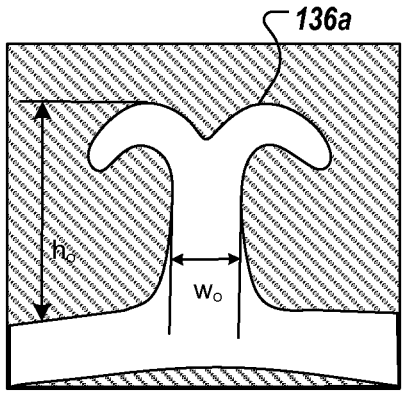
FIGS. 4A-4F are top views of various types of die cavities.
Figure 4B:
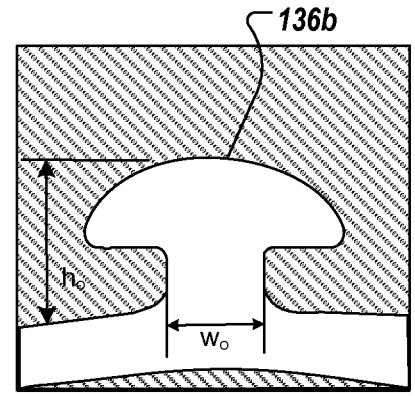
Figure 4C:
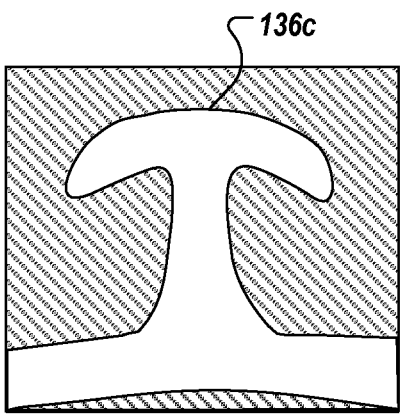

FIGS. 4A-4F show various types of cavities that can be incorporated into the profile of the die head orifice to form fastener elements as the discrete elements. These cavity shapes are useful for extruding rails to be severed to form fastener elements each having a trunk extending outward from the outer surface of the stalk and a head supported by the trunk. The head overhangs the outer stalk surface (i.e., extends laterally beyond the trunk) to define a crook for engaging fibers of a mating component to form a hook-and-loop fastening. The fastener elements can be of the palm-tree type, having two tips that extend in opposite directions as formed from the illustrated cavities, or of the J-hook type, having only a single head that overhangs in a given lateral direction (not illustrated). FIG. 4A, for example, shows a particular embodiment where the cross-section of cavities 136a defines a palm-tree shape. In a particular example, the palm-tree shaped cavity has a trunk width $w_o$ of about 0.0188 inch and an overall height $h_o$ of about 0.0575 inch. Other suitable cavity shapes and/or dimensions can also be used. For example, FIG. 4B shows an embodiment where the cavities 136b are configured to mold rails having a convex upper surface. Such a cavity has a relatively large open area that may mitigate the effects of extrusion wall shear stresses (discussed below). In a particular example, the cavity of FIG. 4B has a trunk width $w_o$ of about 0.025 inch and an overall height $h_o$ of about 0.0475 inch. FIG. 4C shows another embodiment in which the cross-section of cavities 136c is of more constant thickness so as to form rails that cool more homogeneously after extrusion. Cavity 136c also has side walls and corners that have an acute cusp shape that may compensate for partial recovery or relaxation of the molten resin after extrusion ("die swell"). In this example, it is expected that the molten resin exiting this irregular mushroom shaped cavity will swell into a desired shape. The rails formed by cavities such as those of FIGS. 4B and 4C are useful for forming fastener elements that stiffly resist decoupling from loops once engaged, whereas the fastener elements formed from rails extruded through the cavities of FIG. 4A will tend to have heads that will open upon a sufficiently high peel load, without necessarily bending the trunk of the fastener element.

Figure 4D:
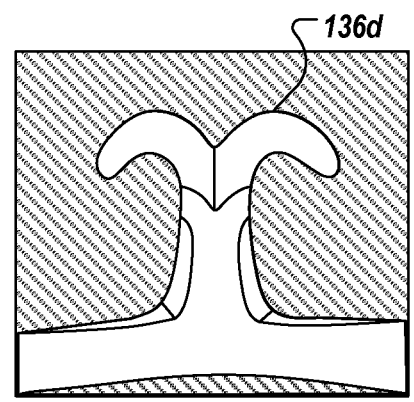

In some examples, the die head cavities are tapered along the extrusion direction, such that the size of the cavity increases as it approaches the distal opening of the die. FIG. 4D, for example, illustrates a cavity 136d (having a shape of similar to the cavity of FIG. 4A) with an exaggerated taper, as seen looking into the die. Such a taper may, in some cases, compensate for the effects of die swell, allowing resin in the cavity to at least partially relax or swell during extrusion. The taper may also permit the cavities to be placed closer together (i.e., at their exits) while leaving sufficient die material between adjacent cavities at inboard locations, thereby maintaining the structural integrity of the die head. Alternatively, the cavities can be tapered along the extrusion direction, such that the size of the cavities decreases as it approaches the opening of the die head. In some examples, the die cavities are not tapered, but are bounded by surfaces that extend straight along the extrusion direction.

Figure 4E:
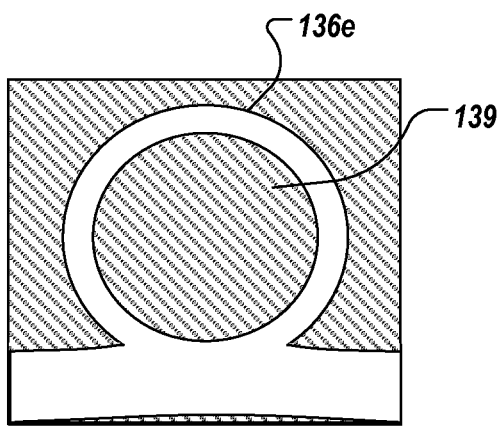
Figure 4F:
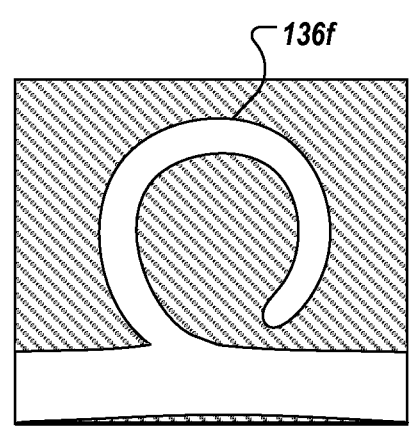

FIGS. 4A-4D show various cavities that can be used to form male fastener elements (e.g., hook structures). However, other types of cavities can also be provided to form various types of extruded structures. For example, FIG. 4E shows an embodiment where cavities 136e are shaped as closed loops, each cavity surrounding a circular die core pin 139 about which the resin flows within the die, so as to form a closed cylinder of resin prior to the die opening. FIG. 4F shows a similar embodiment where cavities 136f are shaped as open loops, with the inner surface of each cavity formed by an extension of the die wall. Both of these types of cavities can be used to form fastener elements that are hook-engageable in the cross-machine direction. Accordingly, the resulting sheet-form product can function as the female component of a hook-and-loop fastener. This type of blown film manufacturing process may create a final loop product with a thinner backing thickness than is possible using conventional methods of manufacture.

Figure 5A:
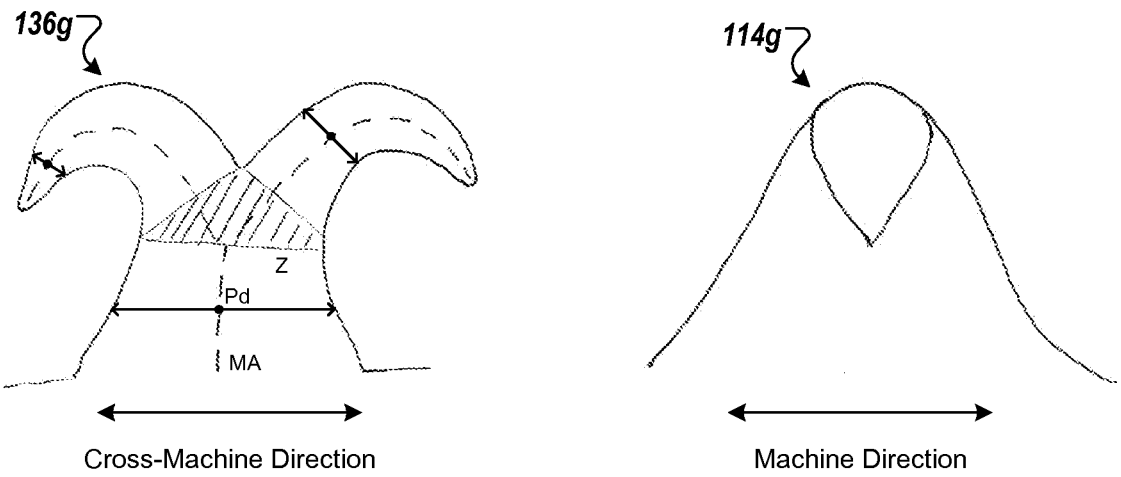
FIGS. 5A-5C are diagrams illustrating the combined effects of wall shear stress and stretching on various extruded profiles.

As noted above, the effects of extrusion wall shear stress may cause molten resin near the cavity walls to flow slower than resin near the center of the cavity. FIG. 5A shows a die cavity 136g having a wide trunk and a palm tree shaped head that terminates in opposing pointed tips. In this case, we have found that shear stress imparted on molten resin flowing through the die cavity 136g causes the resin to flow slower through the pointed tips, where there is less "flow thickness", than in other portions of the cavity. By "flow thickness", we are referring to a distance Pd between the cavity walls at a given point measured perpendicular to the cavity's medial axis MA. By "medial axis", we are referring to a line made up of a set of points that have more than one shortest distance to the cavity wall.

We note that in some cases, it may not be possible to determine the flow thickness at certain points along the medial axis. For instance, the zone Z in FIG. 5A marks a portion of cavity 136g where the flow thickness is indeterminate due to the split of the medial axis. In this example, the indeterminate zone is defined by the intersection points between three particular edges that run through the medial axis. The first edge runs through the point where the medial axis diverges, and is perpendicular to a point on the medial axis just below the divergent point. The second and third edges are also perpendicular to the medial axis, and intersect at a point where the cavity wall diverges to form the head of the hook element. Hook element 114g (shown in the cross-machine direction), which is the resinous structure resulting from extrusion through cavity 136g, includes a head having tips that converge to a point in the machine direction due to the combined effects of stretching and decreased flow in the tip regions.

Figure 5B:
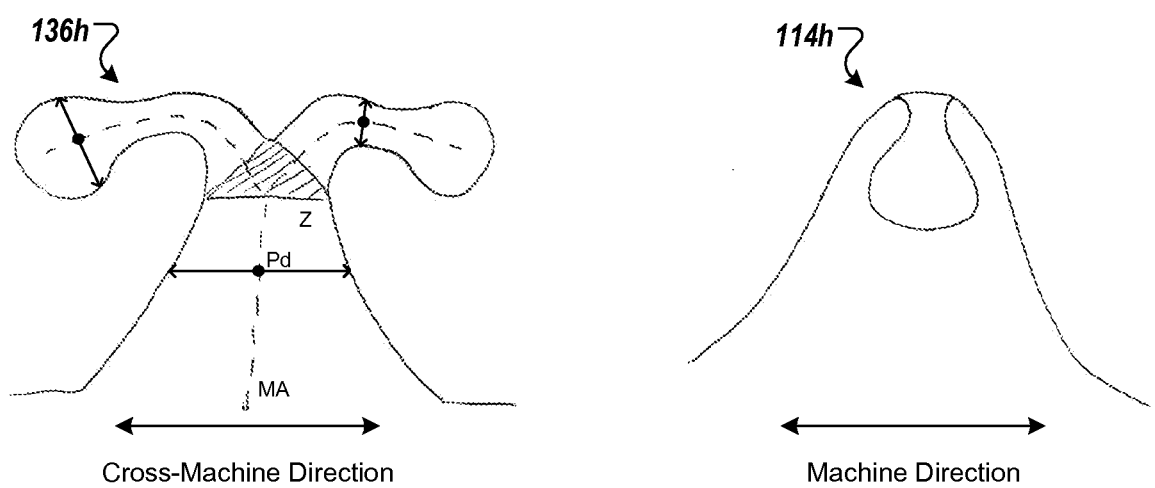
Figure 5C:
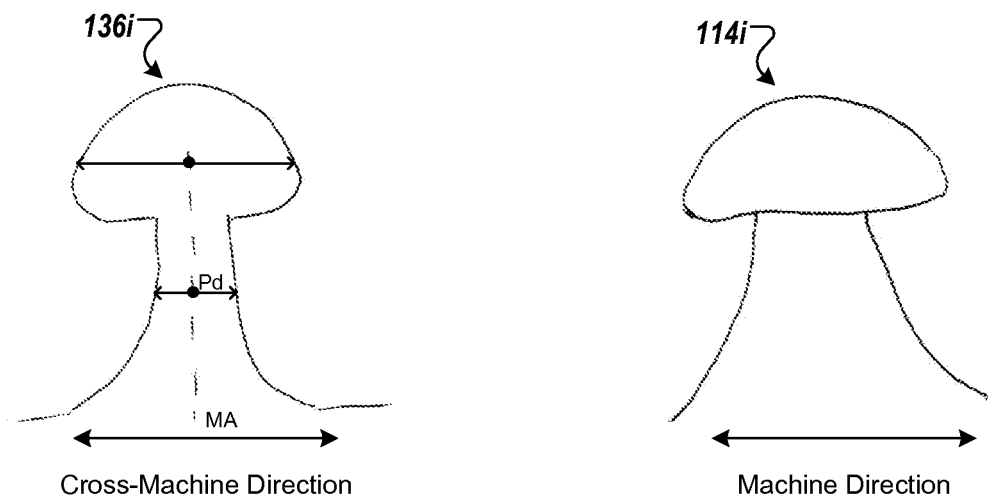

The effects of wall shear stress and flow variation may be leveraged to form other types of hook elements with heads that provide defined features (e.g., loop-engageable crooks or other desired features) in the machine direction, as well as in the cross-machine direction. FIGS. 5B and 5C show additional examples where the die cavity defines a hook shape having a particularly non-uniform cross-section (that is, a profile shape where the flow thickness varies along the medial axis). In fact, in these illustrations, the die cavities have been purposefully depicted as having noticeably thin and bulbous portions to demonstrate this general concept. FIG. 5B, for example, shows a hook cavity 136h defining a palm tree shaped head terminating in particularly bulbous, reentrant tips. In this example, the tips of a resulting hook element 114h flare outward from the stems of the head in the machine direction (as opposed to tapering inward as shown in FIG. 5A), due to the combined effects of stretching and increased flow through the bulbous tips. FIG. 5C shows a hook cavity 136i which defines a particularly thin trunk crowned with a head that provides a much wider flow area. In this instance, we expect that the head of the resulting hook element 114i will overhang the trunk in the machine direction, providing additional crooks for possible loop engagement.

FIG. 6 shows a particular embodiment of die head 106a including cavities 136a, which define palm-tree shaped cross sections, and at least one cavity 136j defining the shape of a non-fastening structure, such as a longitudinally continuous sealing gasket or lip. Closed loop cavities 136e, shown in FIG. 4E, provide an additional example of a cavity shape that can be used to form a non-fastening structure. In particular, the closed loop cavity shape may be particularly useful for forming gasket-type flow barrier.

In some cases, it may be desired to leave some of the continuous rails uncut (for example, when forming a gasket structure). FIG. 7 shows yet another embodiment of die head 106a. In this example, closed loop cavity 136e is recessed compared to surrounding cavities 136a. The recessed cavity extrudes a structure that is entirely out of the circular cutting path traced by the blades of the rotating cutting ring, so as to remain uncut. In particular, the upper edge 147 of the recessed cavity is at a radius, from the center of the extrusion die, less than the radius to the outer edge 149 of annular orifice 138. The bends in the tube wall as extruded are eliminated under effects of the tube blowing following the cutting.

Figure 8A:
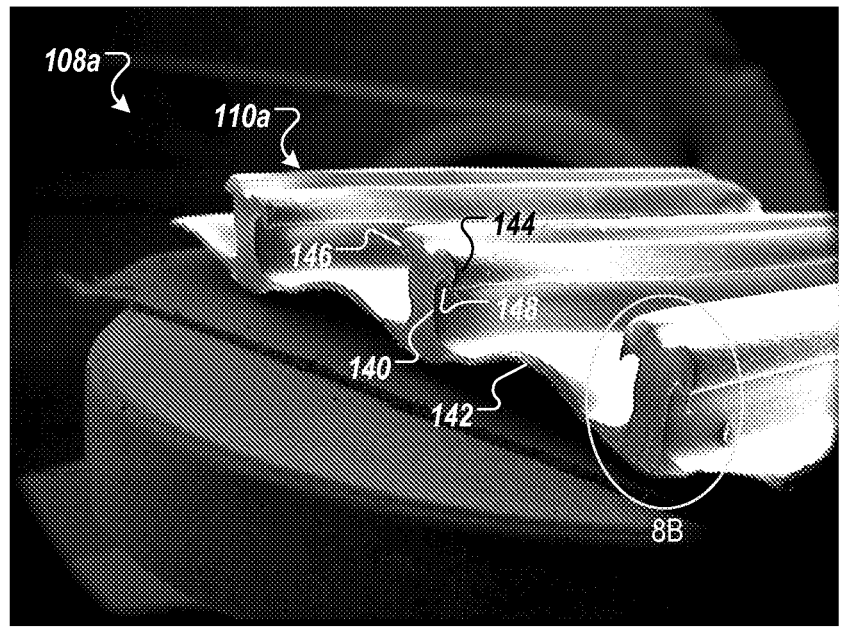
FIG. 8A is a photograph providing a perspective view of a cut out section from an extruded stalk.
Figure 8B:
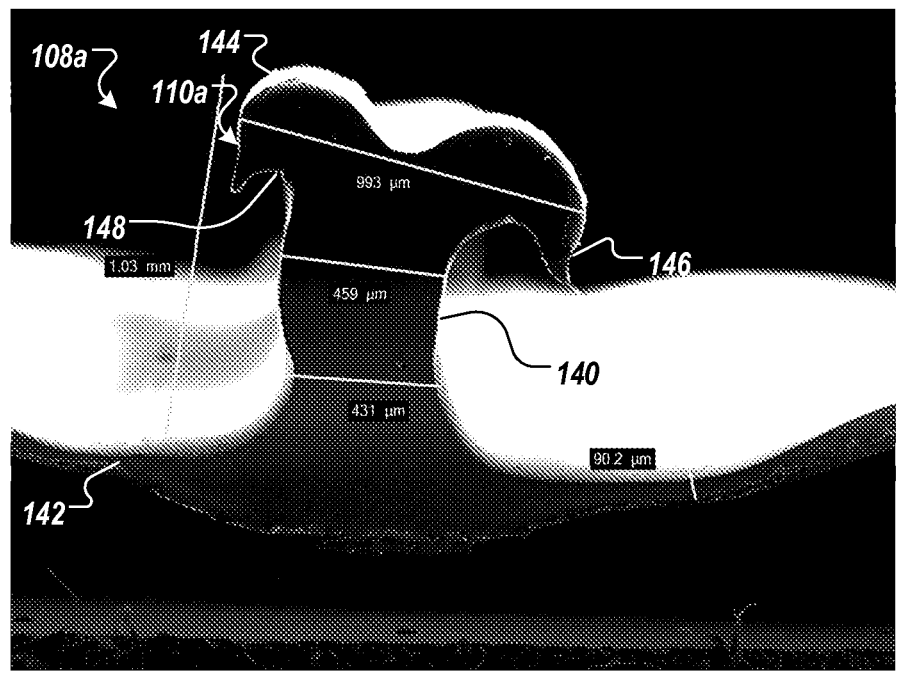
FIG. 8B is a photograph providing enlarged front view of an area marked 8B in FIG. 8A.

As described above, the cross-section of the continuous rails formed on the outer surface of the extruded stalk is defined in part by the shape of the radial die cavities. For example, referring to FIGS. 8A and 8B, continuous rails 110a of stalk 108a have a palm-tree shaped cross-section. More specifically, continuous rails 110a include a trunk 140 extending from a base material 142 (e.g., the tubular wall of the stalk), and opposing heads 144 extending from either side of trunk 140. Heads 144 terminate in respective re-entrant tips 146, forming crooks 148. Further, although the discussion thus far has focused mainly on mono layer extrusions, multi-layer co-extrusion applications are also contemplated. For example, U.S. Pat. Nos. 6,902,385 and 5,984,657, the entireties of which are hereby incorporated by reference, describe multi-layer blown film extrusion dies.

Figure 9A:
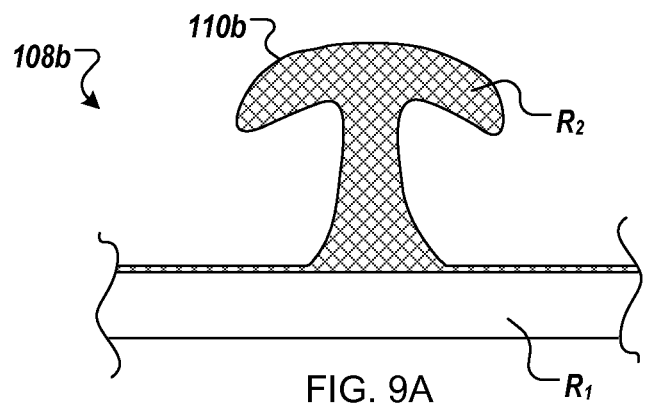
FIGS. 9A-9C are diagrams of a stalk formed using co-extrusion techniques.
Figure 9B:
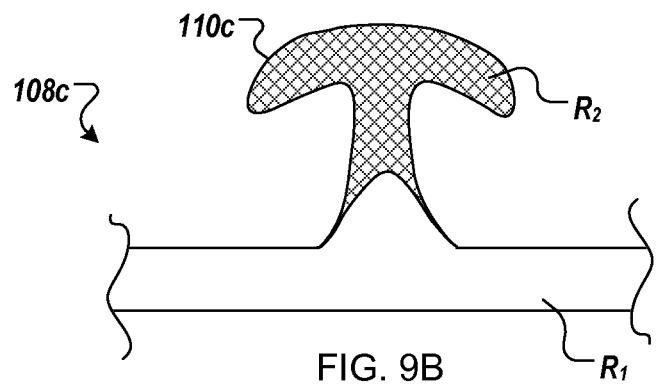
Figure 9C:
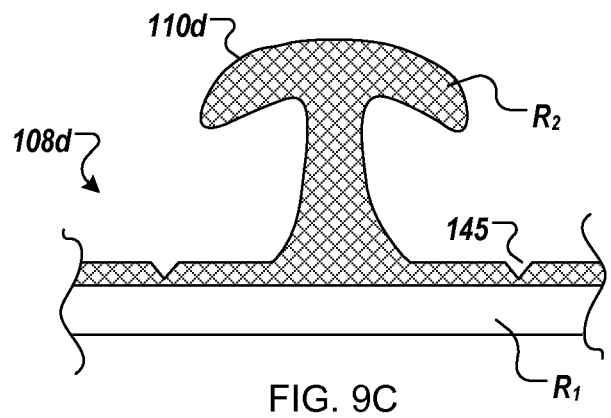

Co-extrusion applications may be particularly useful when it is desired to form the discrete elements of the blown film product from one material and the base web from a different material. For instance, it may be advantageous to form fastener elements from a harder, stiffer resin and the base web from a softer, more flexible resin. With particular reference to FIG. 9A, a first diagram of a stalk 108b having co-extruded layers includes a first thermoplastic resin $R_1$ that forms the tubular wall of the stalk, and a second thermoplastic resin $R_2$ that forms both continuous rails 110b and a thin film layer overlying the tube wall. FIG. 9B shows a second diagram of a stalk 108c with co-extruded layers of resin. In this example, thermoplastic resin $R_1$, forms both the tubular wall of stalk 108c, and a base portion of continuous rails 110c. FIG. 9C shows a third diagram of a stalk 108d with co-extruded layers of resin. In this example, the thin film layer of thermoplastic resin $R_2$ includes notches 145 between adjacent rails 110d. Notches 145 can be formed during the extrusion process, for example, by accommodating the profile of the die head bore, or by scoring the film layer outside of the die head. In some examples, the notches can serve as break points configured to tear open and separate during expansion of the stalk. The separation points can add flexibility to the product, for example, when resin $R_2$ is a more rigid material than resin $R_1$.

Figure 10A:
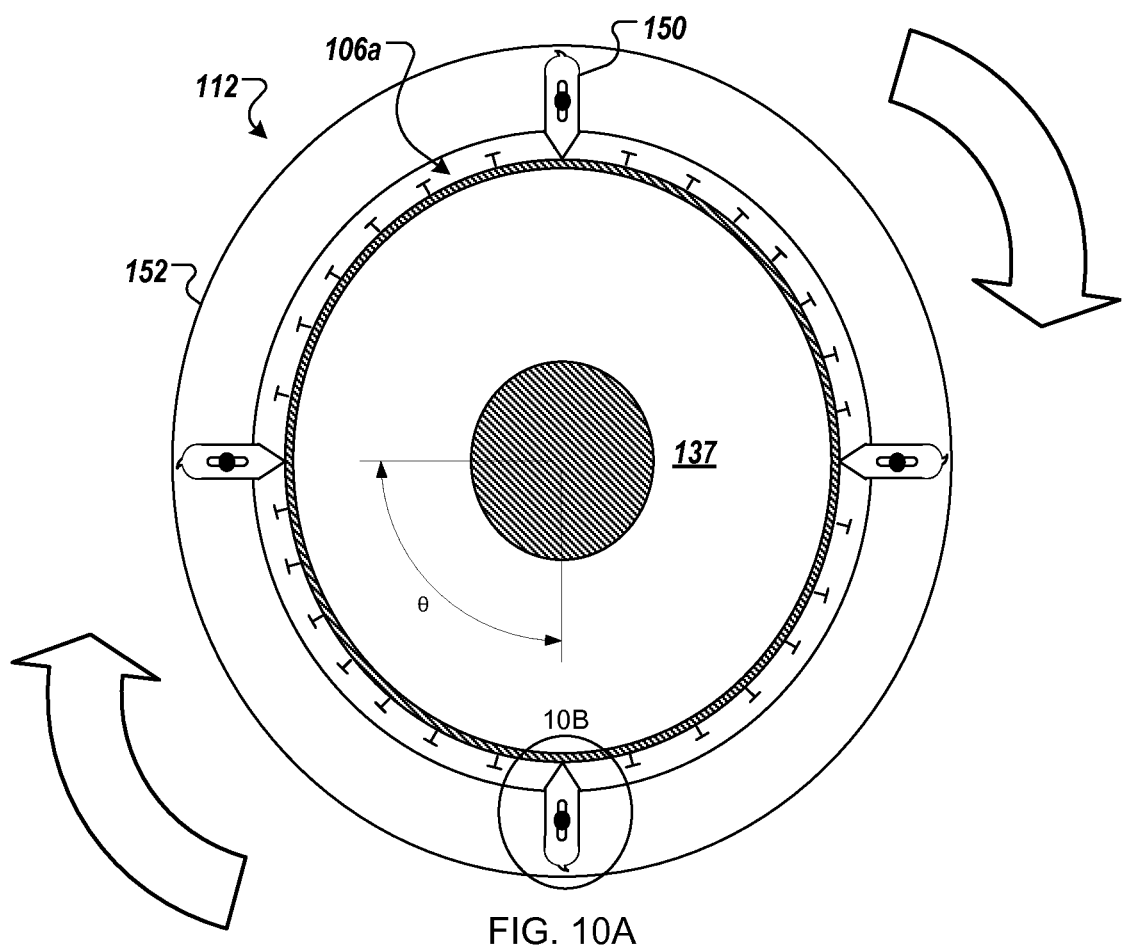
FIG. 10A is a top view of a cutting ring mounted concentrically about a blown film extruder.
Figure 10B:
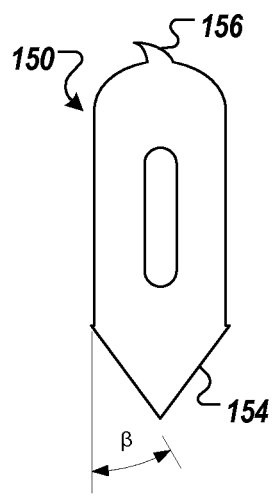
FIG. 10B is an enlarged view of an area marked 10B in FIG. 10A.

Referring to FIG. 10A, cutting assembly 112 includes a cutting ring with one or more blades 150. The cutting blades are positioned to sever the continuous rails of the extruded stalk widthwise, cutting through them in a direction perpendicular to the extrusion direction, to form discrete elements. The cutting blades sever the continuous rails without cutting through or scoring the base material that forms the tubular wall of the stalk. (In some other implementations, for example co-extrusion applications, it may be desired to score the outer surface of the tubular wall to form notches or break points on the stalk.) Cutting ring carries blades 150 are spaced apart from one another by a predetermined angle θ along the circumference of a supporting annular flange 152. In this example there are four blades 150 spaced at an angle θ is 90°. However, in some other examples one, two, three, six or significantly more blades can be included in the cutting ring. In general, the number of cutting blades provided on the cutting ring can be selected based on any one, or a combination, of several process parameters (e.g., desired hook density, cutting speed, extrusion speed, die size, etc.). In a particular example, blades 150 are releasably secured to flange 152 by appropriate mechanical fasteners that allow for some radial adjustment of the blade position. However, the blades can also be formed integrally with the supporting flange, or formed as non-adjustable inserts. As shown in FIG. 10B, each blade 150 includes a straight, angled cutting edge 154 and a curved cutting edge 156. In a particular example, the cutting angle β of cutting edge 154 is about 37 degrees. In a particular example, the outer cutting edge radius of cutting edge 156 is about 0.12 inch, and the inner cutting edge radius is about 0.06 inch.

FIG. 11 shows an embodiment where the cutting ring is supported away from the die head face (for example, as shown in the blown film apparatus of FIG. 1). In this example, mandrel 137a protrudes through the opening defined by die head 106a to support an extruded stalk during the cutting operation. Cutting blades 150 are biased against the tapered surface of a support structure 151 such that they ride against the tapered surface as the cutting ring is rotated. As shown, the support structure defines an opening that receives the extended mandrel. This opening may have a similar shape to that of the die head. For instance, support structure 151 may define radially extending cavities that are at least similar to the cavities of die head 106a. That is, the cavities of the support structure may have a similar shape as the die head cavities. In some examples, the support structure cavities are identical to the die head cavities. In any event, the support structure cavities are aligned with the die head cavities, such that the continuous rails extruded from the die head are able to pass through the support structure, and are supported on a side opposite the side on which the rails are engaged by the cutting blade, to support the rails during cutting. With this configuration, the continuous rails can be allowed to at least partially solidify before the cutting process and the bi-axial stretching of the stalk in the film blowing process. In some examples, the outer surface of the stalk is cooled (for example using a cooling ring) to promote solidification of the extruded rails, while the inner surface of the stalk is heated (for example by heating mandrel 137a) to maintain the stretchability of the stalk.

In the configuration shown in FIG. 12A, cutting ring 112 is positioned such that cutting blades 150 are biased directly against the tapered surface of die head 106a. As a result, the cutting blades ride against the tapered die head during the cutting operation, severing the extruded rails at the die opening where the rail material is still above its softening temperature. Preferably, the blade remains in direct contact with the die across the full height of the cavity throughout its rotation, to avoid excess resin buildup between the blade and die face.

FIGS. 12B and 12C show different implementations of the die head and cutting blade interface. These illustrations also show a mandrel 137b defining a straight, non-tapered inner surface. In FIG. 12B, die head 106a has a straight tapered face such that cutting blades 150 are held in a planar alignment. Accordingly, in this example, linear cuts in the continuous rails are formed when the cutting ring is rotated around the die head. In FIG. 12A, the face of die head 106b is irregularly shaped, and the blades are shaped to follow the non-linear face profile of the die head, such that the resulting cuts in the continuous rails are non-linear. In this manner, the shape, in the extrusion direction, of the discrete elements formed on the surface of the blown film product can be controlled. In each of the embodiments shown in FIGS. 12A-12B, the blades are pressed against the die head face during the cutting operation. However, in some other examples, it may be possible to bias the cutting blades away from the face of the die head to achieve similar or different types of cuts in the continuous rails.

Turning back to FIG. 10A, flange 152 is mounted concentrically with die head 106a, and rotated (e.g., by an electric motor) around the stationary die head to drive the cutting edges of the blades widthwise through the continuous rails. For example, flange 152 can be rotated continuously in complete clockwise or counterclockwise revolutions around died head 106a, or in an oscillating manner (i.e., alternating clockwise and counterclockwise partial rotations about the die head). In a particular example, a flange was rotated continuously, in complete revolutions, at about 125 rpm around a die head having a die diameter of approximately 25 mm. This arrangement provided a linear blade velocity of about 6.5 inches/second (165 mm/second). Of course, other flange rotational speeds can also be used in some implementations. In fact, the rotational speed of the flange is influenced, if not completely defined, by other factors of the cutting process. In particular, a desired pitch of the cutting path (as discussed below) and/or a minimum linear blade velocity may be considered in setting the rotational velocity of the cutting ring flange. For example, the rotational velocity of the flange may be determined based on a minimum linear blade velocity that is needed to generate sufficient cutting force for achieving a clean slice through the continuous rails of extrudate. This minimum linear blade velocity is a function of various process parameters (e.g., blade thickness, number of blades, take-up speed, resin condition, extrusion speed, etc.). In various examples, linear blade velocities of about 2.7, 4.4, and 7.4 inches/second (about 69, 112, and 188 mm/second) were achieved by implementing corresponding flange rotational speeds about a die head having a 2.8 inch (71 mm) die diameter.

Figure 13A:
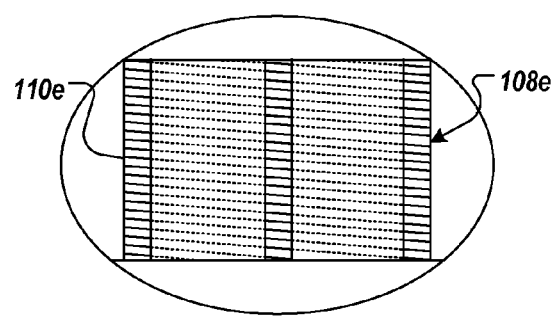
FIG. 13A is side view of an extruded stalk marked with a helical cutting path.

When the flange rotates continuously in one direction about the die head, the blades each trace a respective, helical cutting path around the stalk. The helical cutting path can be useful, for example, when it is desired to cut through each of the continuous rails on the extruded stalk at a constant interval or pitch, as shown in FIG. 13A. An appropriate combination of flange rotational speed and the number of cutting blades can be used to achieve a desired pitch, at a given take-up speed of the blown film line. More specifically, these factors combine to define the time interval between cuts of a particular continuous rail (the "cut-time interval"). A larger cut-time interval corresponds to a larger pitch in the cutting path, and vice versa. Table 1 illustrates the effect of flange rotational speed and blade number on the cut-time interval, for a die diameter of 2.8 inches (71 mm).

TABLE 1

| Flange Speed (RPM) | 1 blade | 3 blades | 6 blades |
| --- | --- | --- | --- |
| 18 | 3.333 sec. | 1.111 sec. | 0.556 sec. |
| 30 | 2.000 sec. | 0.667 sec. | 0.333 sec. |
| 44 | 1.364 sec. | 0.455 sec. | 0.227 sec. |
| 50 | 1.200 sec. | 0.400 sec. | 0.200 sec. |

Figure 13B:
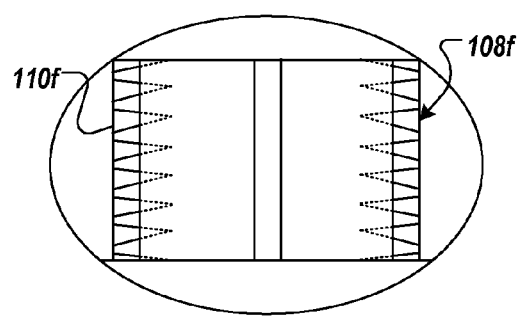
FIG. 13B is a side view of an extruded stalk marked with a zig-zag cutting path.

When the flange rotates in an oscillating manner, the blades each trace a respective zig-zag cutting path along a circumferential portion of the stalk. The zig-zag cutting path can be useful when it is desired to leave a continuous extruded feature uncut, as shown in FIG. 13B. In FIGS. 13A and 13B, the solid lines represent portions of the cutting path where the blades cut through continuous rails 110e, 110f, and the dotted lines represent portions of the cutting paths where the blade is not in contact with stalks 108e, 108f. In some examples, the continuous rails that have been purposefully left uncut by the oscillating cutting ring can be formed as seals or closure elements. For example, an uncut rail can be formed as one half of a rib-and-groove fastener, such as for use in packaging applications. For example, U.S. Pat. No. 6,851,161, the entirety of which is hereby incorporated by reference, describes several continuous longitudinal structures that may be utilized as part of a reclosable closure.

In some cases, circumferential forces applied to the soft stalk during cutting may cause the rows of discrete elements on the final product to appear noticeably canted. To overcome this effect and provide substantially straight rows of discrete elements on the final product, the stalk can be continuously twisted at an appropriate speed and direction during the cutting operation to compensate for the helical cutting path. Or the stalk may be twisted to purposefully induce a desired pattern in the resulting array of fastener elements.

The cutting speed, extrusion rate and temperature, sharpness, shape, thickness and/or angle of the blade cutting edge can be varied to achieve a clean slice through a particular extrudate material and rail shape, such that no appreciable material is removed during cutting. In a particular example, cutting blades having a thickness of about 0.008 inch were used to achieve a clean cut through the continuous rails. However, we expect that the appropriate blade thickness will vary based, for example, on the type of resin used, the condition of the resin at the die exit, the cutting speed, and the extrusion speed.

The cutting blades and/or the die head may be coated in a lubricant material that facilitates clean cutting of the rails. Achieving a clean cut through the extrudate can be advantageous in helping to inhibit accumulation of resin on the cutting blade, which can interfere with continuous operation. Cleanly cutting through the continuous rails can also help maintain consistent fastener element shape (notwithstanding any unintentional die swell effects). When little or no material is removed during the cutting operation, discrete elements cut from the same rail are very close to one another along the extrusion direction, prior to longitudinal stretching. As a result, the un-stretched length of each fastener element 114 is approximately equal to the pitch of the helical or zig-zag cutting path. In some examples, the pitch can be modified by adjusting the number of cutting blades, the rotational speed of the flange, the take-up speed, and/or the rate of extrusion. For instance, to achieve a particular pitch, a cutting ring with two blades would require a faster rotational speed than a cutting ring with four blades.

In some examples, the cutting operation can affect the stretchability of the stalk. For example, the depth of cut through the continuous rails protruding radially outward from stalk's outer surface may be a contributing factor in the degree of stretch that is achieved during inflation. That is, the stalk may be more inclined to stretch when the continuous rails are completely severed, as compared to an implementation where the rails are only partially severed. In the former case, the discrete elements are completely separated from one another such that there is little resistance to stretching, apart from the deformation resistance of the resin that forms the wall of the stalk. In the latter case, when the rails are only partially severed, the discrete elements remain connected by a rib which further inhibits stretching of the stalk. As a result, in some implementations, the cutting operation can be tuned to achieve a selected hook density on the final fastening product by affecting the pitch between rows of hook elements.

Figure 14A:
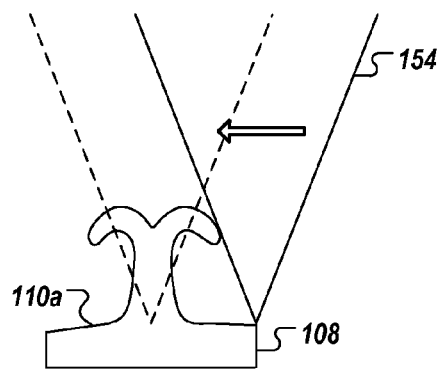
FIG. 14A is a top view of a triangular blade tracing a cutting path through a continuous rail.
Figure 14B:
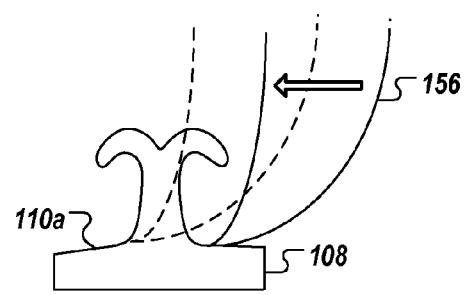
FIG. 14B is a top view of a curved blade tracing a cutting path through a continuous rail.

As shown in FIGS. 14A and 14B, each of the respective cutting edges 154, 156 can be configured to implement a particular type of cutting action. For example, cutting edge 156 is configured to make first contact with the base of continuous rail 110a, while cutting edge 154 is configured to make first contact away from the base, near one of the tips of the rail profile. Cutting through the trunk early in the cutting cycle can, for example, help to diminish some of the effects of longitudinal stretching on profile deformation. In some examples, the type of cutting edge used is determined based on the stalk material and/or the cross-section of the continuous rails. Various other factors (e.g., extrusion rate, cutting speed, etc.) can also be considered in selecting a suitable type of cutting edge.

As shown in FIGS. 14A and 14B, the cutting blades are not large enough to completely block any of the die head cavities. Therefore, extrusion of the stalk and continuous rails remains substantially uninterrupted during the cutting process, and the flow within each die head cavity is not halted. This can help to increase processing speeds and the resulting areal density of the discrete elements, while moderating die swell. As a result, additional expansion of the stalk can be accomplished while maintaining a minimum density of the discrete elements. Furthermore, unequal flows from different portions of any particular die cavity, as the cutting blade progresses across the cavity, can be considered in the design of the cavity shape, to achieve desired variation in the longitudinal dimensions of various fastener element features. However, for some applications it may be preferred to configure the blades such that they fully interrupt extrusion of any given rail, so as to space the discrete elements apart from one another longitudinally, particularly under conditions in which the severed elements might tend to otherwise fuse back together immediately after cutting.

Figure 15:
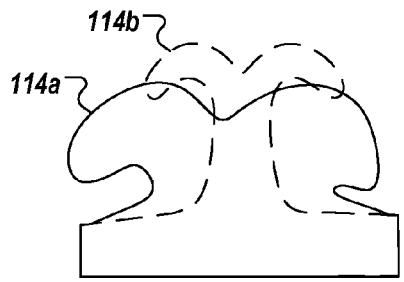
FIG. 15 is a front view of a stretched fastener overlaid by a front view of an unstreteched fastener element for comparison.
Figure 16A:
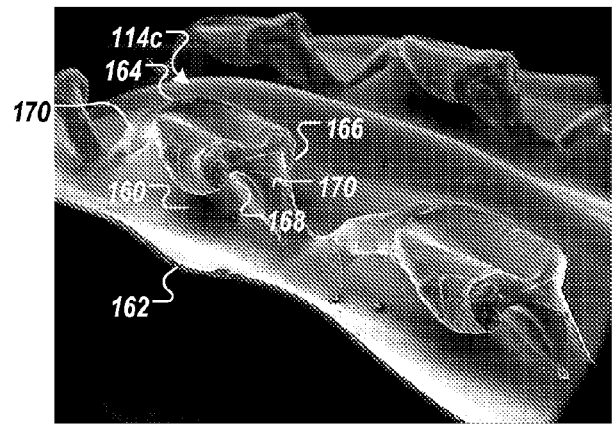
FIGS. 16A-17 are photographs providing perspective views of a cut out section from a stretched blown film tube.
Figure 16B:
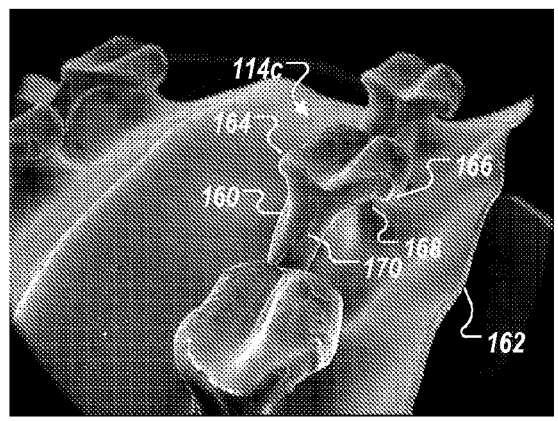
Figure 17:
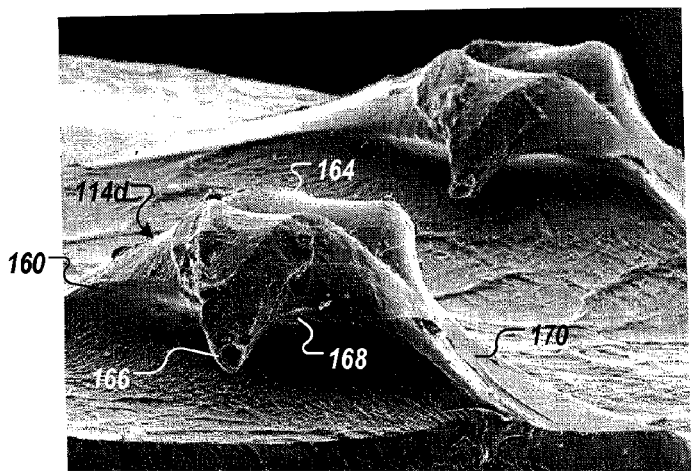

Referring now to FIGS. 15-17, we have found that the shape and characteristics of the discrete elements formed on the outer surface of the stalk may be altered by parameters of the expansion (e.g., the axial and radial stretching of the stalk) and cutting process. For example, expansion of the stalk may cause the discrete elements to increase in length and/or width, and proportionally decrease in height. FIG. 15 shows an example comparison between the profile of a stretched element 114a and an unstretched element 114b in the extrusion direction. The degree to which the dimensions of the discrete elements are altered can be influenced by various film blowing process parameters, such as the blow ratio and the gauge reduction ratio. For instance, implementing higher blow and gauge reduction ratios causes more stretching of the stalk, and therefore a greater alteration in the dimensions of the discrete elements formed on its outer surface. The cutting operation can also affect the degree of stretch deformation applied to the discrete elements. For example, when the cutting operation is performed farther from the frost line (i.e., closer to the die head) when the extruded resin is particularly molten, the elements experience more stretching than when the cutting is performed nearer to the frost line height when the resin has begun to solidify. As described with reference to a few examples below, causing the discrete fastener elements to assume a shape altered from the profile of the extruded rails, by control of the cutting and blowing processes, can be utilized to potential advantage.

Referring first to the example of FIGS. 16A and 16B, discrete elements 114c are stretched palm tree type fastener elements. In this particular example, each of fastener elements 114c includes a trunk 160 extending from a base material 162 (e.g., the tubular wall of the thin film tube), and opposing heads 164 extending from either side of trunk 160. Heads 164 terminate in respective re-entrant tips 166, forming loop engageable crooks 168.

In some cases, the lengthwise and widthwise stretching of the fastener elements introduces curved surfaces to the hook profile. For instance, in this particular example, stretching in the extrusion direction causes the leading and trailing faces 170 of the fastener elements in the extrusion direction to become severely sloped. The rounded profile may mitigate the effects of skin abrasion that sharp corners and/or flat surface can produce. This may give the surface of the resulting fastener product a desired effect, e.g., a softer and more pleasant surface "feel" for contact with the skin, for cases where such contact may occur.

In this example, the stretching may also increase the surface area of the loop engageable crooks 168. As a result, the crooks may be able to resist greater peel loads and the fastener elements may be provided with greater loop-retention characteristics. Further, in some particular implementations, the stretching can provide advantageous molecular orientation, resulting in increased peel strength and the capability to endure higher numbers of fastening cycles before failure. In addition, the stretching of fasteners 114c may introduce a taper to tips 166. As noted above, the tapered tips may also be produced by shaping the die head cavities to reduce the rate of flow through the tip-forming portions. In some implementations, the tapered tip can increase the loop-engagement capabilities of the fastener element. For example, the tapered tip may more readily penetrate and engage with loop material than a constant cross-section tip.

Referring to FIG. 17, fastener elements 114d were formed in the same die cavities as those of FIGS. 16A-B, but were subjected to even more longitudinal stretching during the blowing process. As noted above, this particular type of stretched fastener element can be achieved, for example, by implementing an increased blow ratio and/or draw ratio in the film blowing process, or by performing the cutting operation nearer to the die head (i.e., farther from the frost line height). As a result of the greater stretching, the modified dimensions of the fastener elements are more clearly defined. For example, fastener elements 114d have sharper tips and more severely sloped faces than fastener elements 114c. Additionally, fastener elements 114d experience a greater reduction in height than fastener elements 114c. Accordingly, in some implementations, fastener elements 114d can be employed as micro hooks, which are particularly well suited for engaging low loft loop materials (e.g., low loft nonwoven fabrics).

Figure 18:
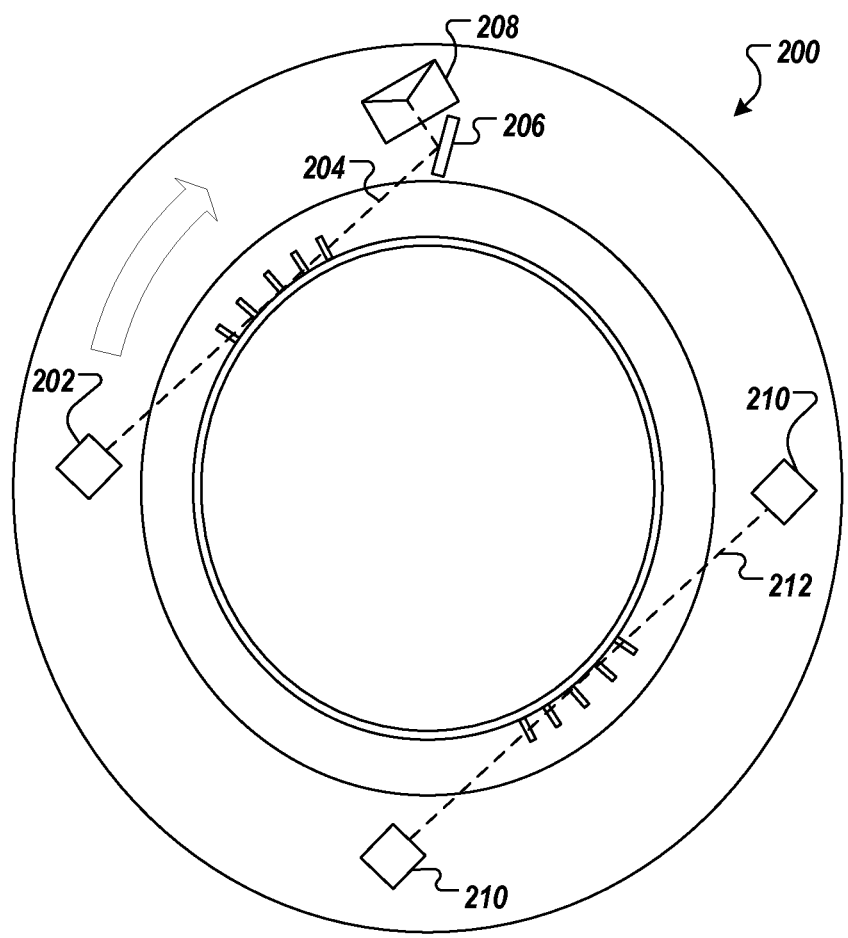
FIG. 18 illustrates two alternate rail severing methods.

While the processes described above have featured severing rails by moving blade, other means of severing the rails may be employed. For example, FIG. 18 illustrates two other techniques for severing the rails, either of which may be employed in connection with any of the other process steps discussed above. Both techniques feature a platform 200 that is continually or controllably rotated about the extruded stalk, either immediately above, or spaced longitudinally from, the die face.

In one technique, shown in the upper portion of FIG. 18, platform 200 carries a beam source 202 that emits an energy beam 204 in a direction tangent to the outer surface of the extruded stalk tube, so as to intercept and cut through the extruded rails as the beam source and its beam are rotated about the stalk. After passing through the rails, the beam may be deflected by a deflector 206 into a beam trap 208. The beam source may be a laser source, for example. The deflector and/or trap may be located off of the rotating platform. The beam would not be expected to appreciably block flow through the die cavities, and may be configured with sufficient power to ablate a discrete thickness of each rail, to prevent the severed elements from fusing immediately after the ablation.

In another technique, shown in the lower portion of FIG. 18, platform 200 carries a pair of supports 210 between which a wire 212 is held taut at a tangent to the outer surface of the extruded stalk tube, and heated to a temperature high enough to sever the rails. The wire is thinner than the height of the die cavities, such that the wire does not completely block any die cavity during the severing.

The following discussion will reference two specific examples of a blown film process in accordance with the present disclosure. These examples are provided solely for the purpose of illustrating multiple combinations of process parameters and the resulting sheet-form products.

Example 1

Figure 19:
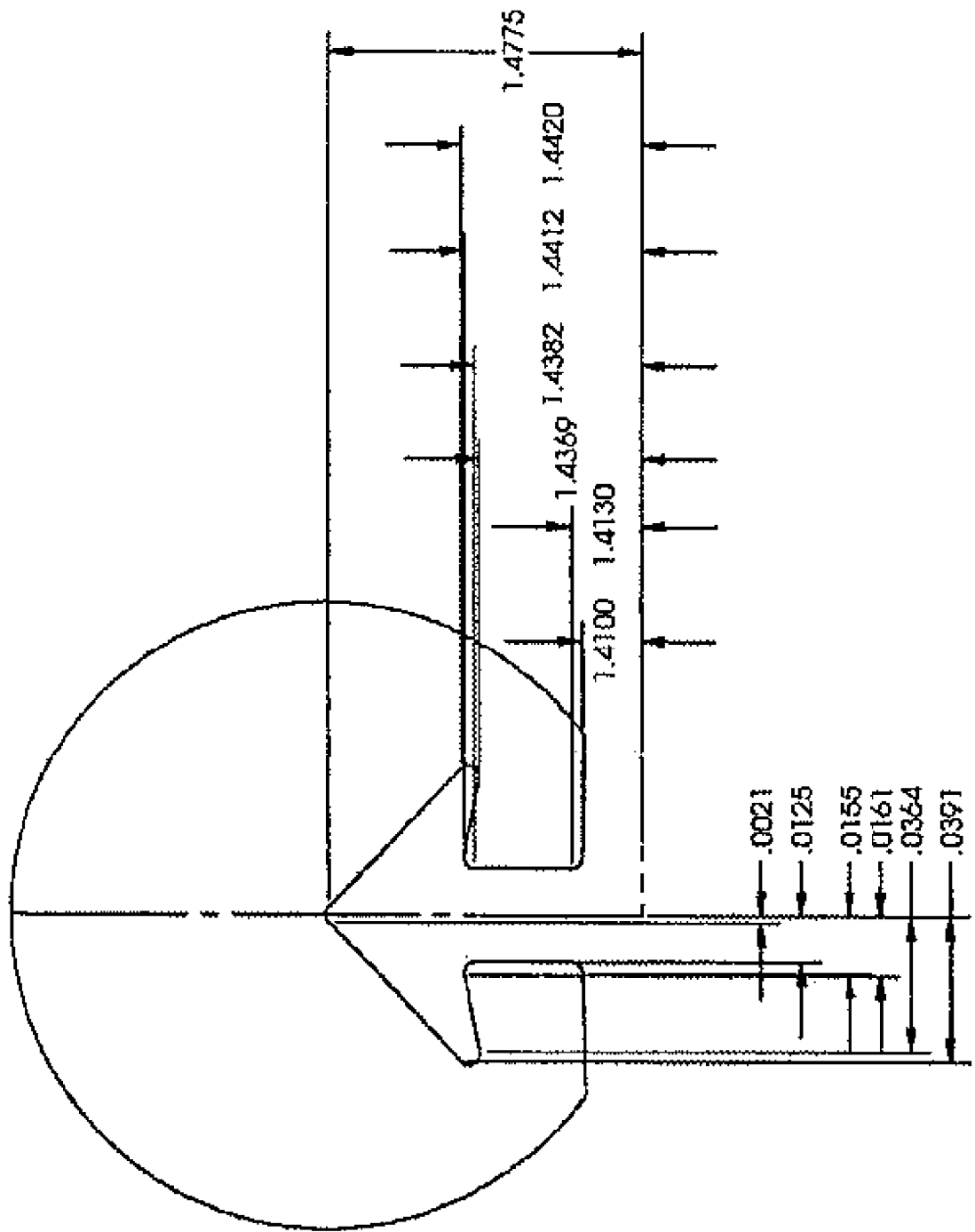
FIG. 19 is a dimensioned diagram of the die cavity of Example 1.
Figure 20B:
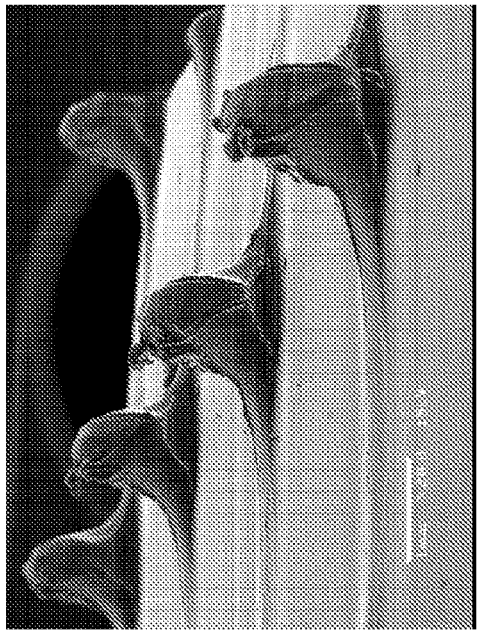
FIGS. 20A-20D are photographs of the product resulting from the process of Example 1.
Figure 20D:
Figure 20A:
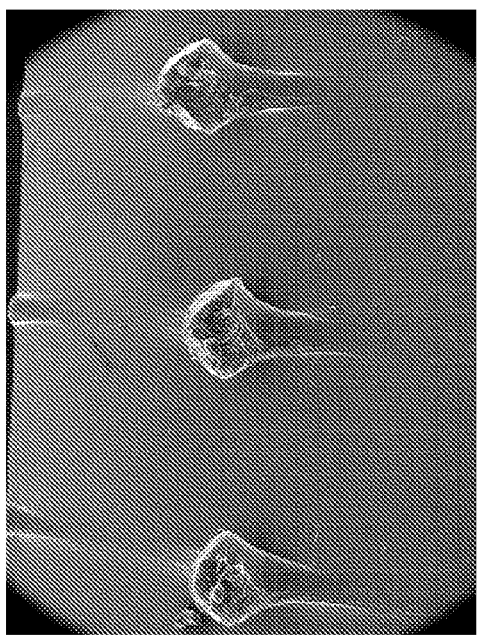
Figure 20C:
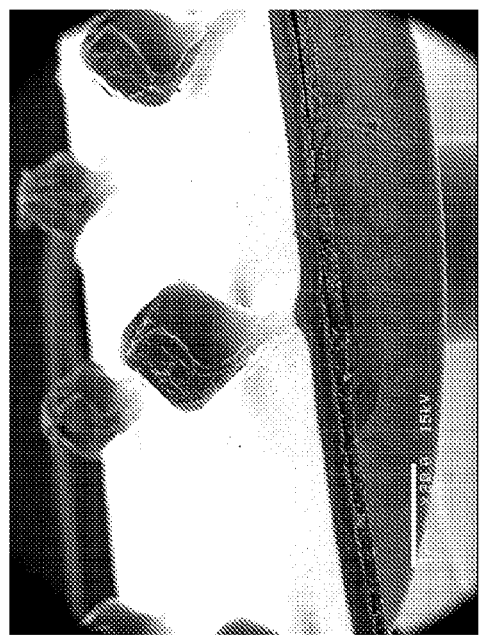

In this example, a blown film apparatus (similar, but not identical to the apparatus 100 of FIG. 1) was operated under the conditions listed below in Table 2. In Table 2, "Line Speed" refers to the rate at which the nip rolls pull the stalk away from the die head. A dimensioned illustration of the die cavity shape is shown in FIG. 19. This configuration produced a sheet-form product according to the specifications, and with the resulting process ratios, set forth in Table 3, and shown in FIGS. 20A-20D.

TABLE 2

| Resin Type | Petrothene 9600 |
| --- | --- |
| Die Gap, inch | 0.03 |
| Melt Temperature, ° F. | 363 |
| Die Temperature, ° F. | 370 |
| Melt Pressure on Extruder, psi | 2500 |
| Extruder Screw Speed, RPM | 30.1 |
| Line Speed, fpm | 3 |
| Cutter Speed RPM | 44 |
| Number of Blades | 3 |
| Die Diameter, inch | 2.8 |

TABLE 3

| Tape Circumference, inch | 11.0 |
| --- | --- |
| Backing Thickness, inch | 0.012 |
| Blow Ratio | 1.25 |
| Gage Reduction Ratio | 0.40 |

Example 2

Figure 21:
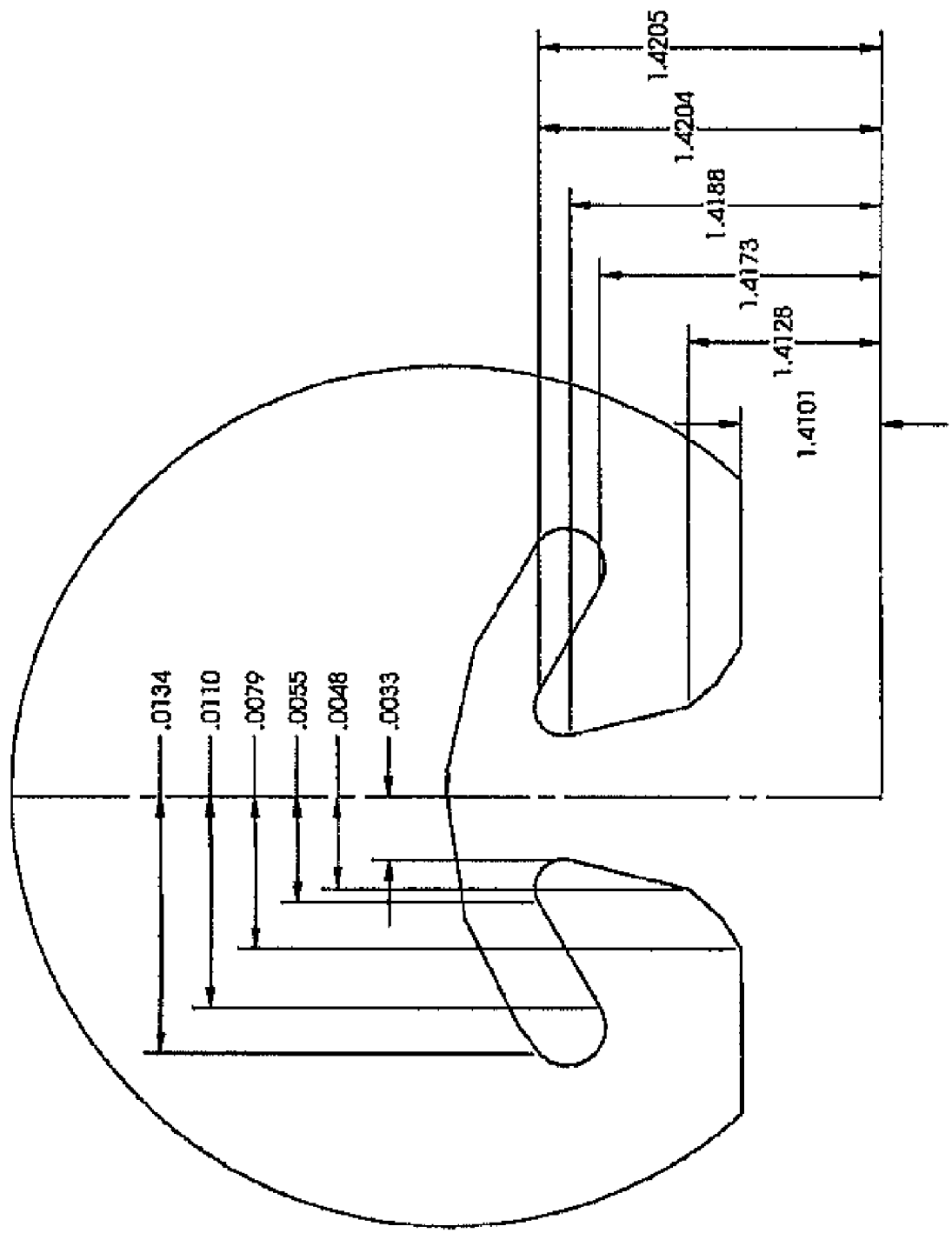
FIG. 21 is a dimensioned diagram of the die cavity of Example 2.
Figure 22A:
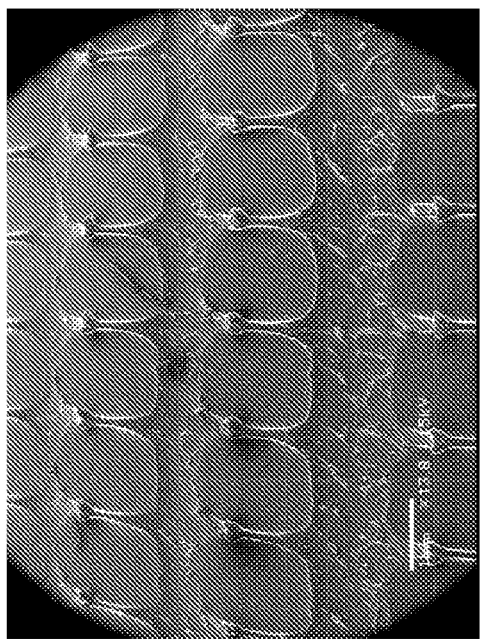
FIGS. 22A-22D are photographs of the product resulting from the process of Example 2.
Figure 22B:
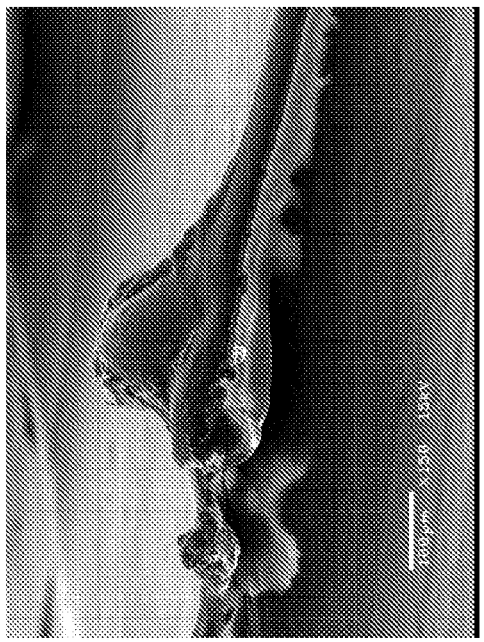
Figure 22C:
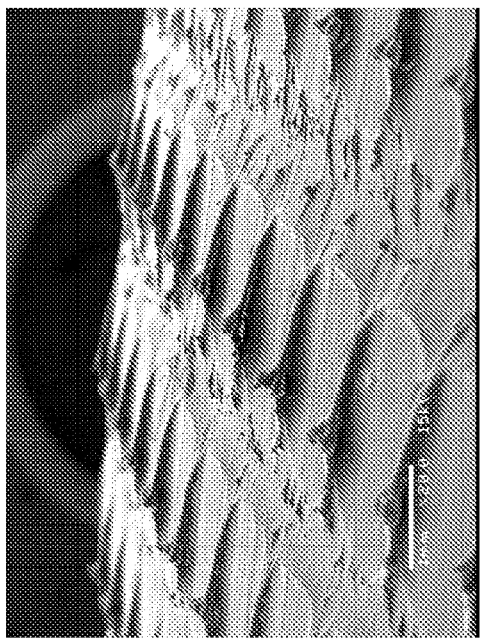
Figure 22D:
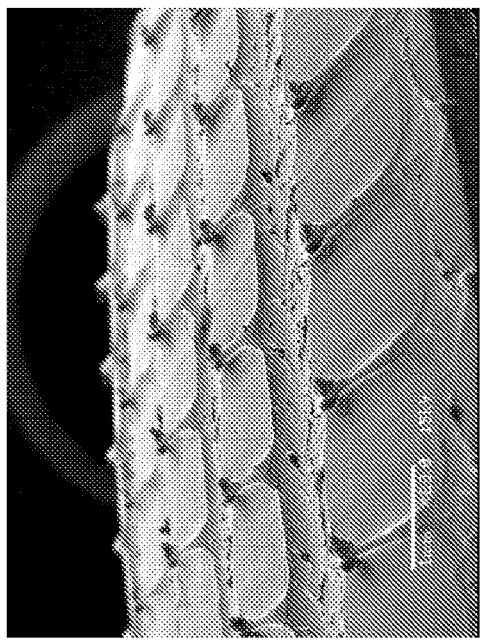

In this example, a blown film apparatus was operated under the conditions listed below in Table 4. A dimensioned illustration of the die cavity shape is shown in FIG. 21. This configuration produced a sheet-form product according to the specifications set forth in Table 5, and shown in FIGS. 22A-22D.

TABLE 4

| Resin Type | Petrothene 9600 |
| --- | --- |
| Die Gap, inch | 0.03 |
| Melt Temperature, ° F. | 359 |
| Die Temperature, ° F. | 360 |
| Melt Pressure on Extruder, psi | 2500 |
| Extruder Screw Speed, RPM | 30.1 |
| Line Speed, fpm | 1.5 |
| Cutter Speed RPM | 44 |
| Number of Blades | 3 |
| Die Diameter, inch | 2.8 |

TABLE 5

| Tape Circumference, inch | 11.9 |
| --- | --- |
| Backing Thickness, inch | 0.017 |

TABLE 5-continued

| Blow Ratio | 1.35 |
| --- | --- |
| Gage Reduction Ratio | 0.57 |

In this example, we observed a product having a significantly greater backing thickness compared to the resulting product of Example 1. This may be attributed to the relatively low line speed, which is about half that of the previous example. An additional consequence of the reduced line speed was a noticeable increase in the density of discrete structures formed on the outer surface of the product. Also visible in the photos is a regular scoring of the backing sheet by the cutting blades, which was caused by a slight misalignment of the cutting system.

Other implementations can also be achieved. For example, the orifice of the die head can be configured to form rails of extruded material having the cross-section of a stem (e.g., without a fiber engaging head). After stretching, the resulting sheet-form product can be optionally passed through a nip between a wrap-around roller and a calender roll while the stems are soft and readily deformable. The calender roll can cap the stems by heated contact under nip pressure, permanently deforming resin of the distal ends of the stems, to form engageable heads.

While a number of examples have been described for illustration purposes, the foregoing description is not intended to limit the scope of the invention, which is defined by the scope of the appended claims. There are and will be other examples and modifications within the scope of the following claims.

What is claimed is:

1. A method for forming a film of plastic material, the method comprising:
   urging molten resin through a die head opening to form a stalk having an extrusion profiled rail of resin material extending radially outward from a tubular wall, the die head opening comprising an annular orifice that defines a thickness of the tubular wall and a cross-sectional shape of the rail;
   cutting the rail to form discrete elements while leaving the tubular wall un-punctured; and
   inflating the stalk with a gas bubble maintained within an interior space of the tubular wall to form a thin film tube,
   wherein cutting the rail comprises slicing through the rail as molten resin uninterruptedly extrudes from the annular orifice.

2. The method of claim 1, wherein slicing through the rail comprises driving a blade widthwise through the rail.

3. The method of claim 1, wherein slicing through the rail comprises driving a blade around a circumference of the stalk.

4. The method of claim 3, wherein driving the blade comprises driving the blade at a linear velocity between about 2.7 and 7.4 inch/second.

5. The method of claim 3, wherein driving the blade comprises driving the blade continuously in a clockwise or counterclockwise direction.

6. The method of claim 3, wherein driving the blade comprises driving the blade in an oscillating routine.

7. The method of claim 3, wherein driving the blade comprises driving the blade in a helical cutting path, with respect to the stalk.

8. The method of claim 7, wherein the blade comprises one or more blades, and wherein driving the one or more blades in a helical cutting path comprises driving the one or more blades at a sufficient rotational speed to achieve a cut-time interval of between about 0.2 and 3.3 seconds.

9. The method of claim 2, wherein driving the blade comprises driving the blade in a zig-zag cutting path, with respect to the stalk.

10. The method of claim 1, wherein slicing through the rail comprises driving a blade through the rail at a distance from the die head, when the resin material has at least partially solidified.

11. The method of claim 1, wherein slicing through the rail comprises driving a blade through the rail when the blade is biased against an outer surface of the die head, prior to solidification of the resin material.

12. The method of claim 1, wherein slicing through the rail comprises driving a blade through the rail cleanly, without removing resin material from the extruded stalk.

13. The method of claim 1, wherein slicing through the rail comprises driving a blade having a straight, angled cutting edge through the rail.

14. The method of claim 1, wherein slicing through the rail comprises driving a blade having a curved cutting edge through the rail.

15. The method of claim 1, wherein slicing through the rail comprises driving a blade through the rail such that first contact by the blade with the rail is made at the base of the rail.

16. The method of claim 1, further comprising drawing the tube, in the extrusion direction, away from the die head during the cutting.

17. The method of claim 16, wherein drawing the tube comprising pulling the tube through a nip between adjacent rollers.

18. A method for forming a film of plastic material, the method comprising:
   urging molten resin through a die head opening to form a stalk having multiple extrusion profiled rails of resin material extending radially outward from a tubular wall, the die head opening comprising an annular orifice that defines a thickness of the tubular wall and a respective cross-sectional shape of each of the multiple rails;
   forming discrete elements of resin material on an outer surface of the tubular wall; and
   inflating the stalk with a gas bubble maintained within an interior space of the tubular wall to form a thin film tube,
   wherein forming discrete elements of resin material comprises dividing at least one of the multiple rails into the discrete elements while leaving at least one other of the multiple rails continuous and unbroken.

19. The method of claim 18, wherein dividing the at least one rail comprises cutting the rail.

20. The method of claim 19, wherein cutting the rail comprises slicing through the rail as molten resin uninterruptedly extrudes from the annular orifice.

21. The method of claim 20, wherein slicing through the rail comprises driving a blade widthwise through the rail.

22. The method of claim 20, wherein slicing through the rail comprises driving a blade around a circumference of the stalk.

23. The method of claim 22, wherein driving the blade comprises driving the blade at a linear velocity between about 2.7 and 7.4 inch/second.

24. The method of claim 22, wherein driving the blade comprises driving the blade continuously in a clockwise or counterclockwise direction.

25. The method of claim 22, wherein driving the blade comprises driving the blade in an oscillating routine.

26. The method of claim 22, wherein driving the blade comprises driving the blade in a helical cutting path, with respect to the stalk.

27. The method of claim 26, wherein the blade comprises one or more blades, and wherein driving the one or more blades in a helical cutting path comprises driving the one or more blades at a sufficient rotational speed to achieve a cut-time interval of between about 0.2 and 3.3 seconds.

28. The method of claim 21, wherein driving the blade comprises driving the blade in a zig-zag cutting path, with respect to the stalk.

29. The method of claim 20, wherein slicing through the rail comprises driving a blade through the rail at a distance from the die head, when the resin material has at least partially solidified.

30. The method of claim 20, wherein slicing through the rail comprises driving a blade through the rail when the blade is biased against an outer surface of the die head, prior to solidification of the resin material.

31. The method of claim 20, wherein slicing through the rail comprises driving a blade through the rail cleanly, without removing resin material from the extruded stalk.

32. The method of claim 20, wherein slicing through the rail comprises driving a blade having a straight, angled cutting edge through the rail.

33. The method of claim 20, wherein slicing through the rail comprises driving a blade having a curved cutting edge through the rail.

34. The method of claim 20, wherein slicing through the rail comprises driving a blade through the rail such that first contact by the blade with the rail is made at the base of the rail.

35. The method of claim 18, further comprising drawing the tube, in the extrusion direction, away from the die head during the cutting.

36. The method of claim 35, wherein drawing the tube comprising pulling the tube through a nip between adjacent rollers.

37. The method of claim 18, wherein dividing the at least one rail comprises interrupting extrusion of the rail.

38. The method of any of claim 18, wherein forming discrete elements of resin material comprises forming discrete fastener elements.

* * * * *